United States Patent [19]

Mehnert

[11] 4,319,332
[45] Mar. 9, 1982

[54] METHOD AND APPARATUS FOR SPACE MONITORING BY MEANS OF PULSED DIRECTIONAL BEAM

[75] Inventor: Walter Mehnert, Ottobrunn, Fed. Rep. of Germany

[73] Assignee: Zellweger Uster Ltd., Uster, Switzerland

[21] Appl. No.: 87,170

[22] Filed: Oct. 22, 1979

Related U.S. Application Data

[63] Continuation-in-part of Ser. No. 30,338, Apr. 16, 1979, abandoned.

[30] Foreign Application Priority Data

Apr. 28, 1978 [DE] Fed. Rep. of Germany ....... 2818942

[51] Int. Cl.³ .............................................. G08B 13/18
[52] U.S. Cl. .................................... 364/516; 340/556; 340/557; 343/5 PD; 356/5
[58] Field of Search ................ 364/516, 460; 340/556, 340/557; 343/5 PD, 5 VQ; 356/5

[56] References Cited

U.S. PATENT DOCUMENTS

| | | | |
|---|---|---|---|
| 3,711,846 | 1/1973 | Schlisser et al. | 340/557 |
| 3,805,064 | 4/1974 | Kornylak | 340/556 X |
| 3,825,916 | 7/1974 | Steele et al. | 340/557 |
| 3,898,639 | 8/1975 | Muncheryan | 340/557 X |
| 4,026,654 | 5/1977 | Beaurain | 356/5 |
| 4,027,303 | 5/1977 | Neuwirth et al. | 343/5 PD X |
| 4,063,085 | 12/1977 | Montanvert | 340/556 X |
| 4,130,360 | 12/1978 | Courtenay | 356/5 X |
| 4,142,187 | 2/1979 | Nakayama | 343/5 PD X |
| 4,158,885 | 6/1979 | Neuberger | 364/460 |
| 4,243,988 | 1/1981 | Kang et al. | 343/5 VQ |

FOREIGN PATENT DOCUMENTS

| | | |
|---|---|---|
| 2129666 | 6/1971 | Fed. Rep. of Germany . |
| 2157815 | 11/1971 | Fed. Rep. of Germany . |
| 2346764 | 9/1973 | Fed. Rep. of Germany . |
| 2353702 | 10/1973 | Fed. Rep. of Germany . |
| 2508796 | 2/1975 | Fed. Rep. of Germany . |
| 2600362 | 1/1976 | Fed. Rep. of Germany . |
| 2613375 | 3/1976 | Fed. Rep. of Germany . |
| 2617467 | 4/1976 | Fed. Rep. of Germany . |
| 2638337 | 8/1976 | Fed. Rep. of Germany . |
| 2656256 | 12/1976 | Fed. Rep. of Germany . |
| 2702499 | 1/1977 | Fed. Rep. of Germany . |
| 2722982 | 5/1977 | Fed. Rep. of Germany . |
| 2052086 | 12/1977 | Fed. Rep. of Germany ......... 356/5 |

OTHER PUBLICATIONS

Harman: Guidor: An Intrusion Detection System for Perimeter Protection, 1976, Carnahan Conferences on Crime Countermeasures, Lexington, KY, May 5–7, 1976, pp. 155/159.

*Primary Examiner*—Felix D. Gruber
*Attorney, Agent, or Firm*—Werner W. Kleeman

[57] ABSTRACT

A monitoring method and apparatus is disclosed for monitoring surfaces and spaces as well as objects present therein. A pulse transmitter delivers, by means of a beam deflection element, in a defined sequence and in defined directions pulsed directional beams, and received beams are directionally selectively received. Distance vectors and their changes are evaluated in a computer for surface or terrain, space and object measurement and/or object recognition and/or sounding of an alarm.

77 Claims, 13 Drawing Figures

METHOD AND APPARATUS FOR SPACE MONITORING BY MEANS OF PULSED DIRECTIONAL BEAM

CROSS-REFERENCE TO RELATED APPLICATION

This application is a continuation-in-part application of my commonly assigned, copending United States application Ser. No. 30,338, filed Apr. 16, 1979, now abandoned entitled "Virtual Lightguard Fence Providing Area Monitoring With Warning And Protected Zones".

BACKGROUND OF THE INVENTION

The present invention relates to a new and improved method of, and apparatus for, surface or terrain and space monitoring by means of pulsed directional beams.

There are already known to the art different types of light barriers, such as for instance disclosed in German Patent Nos. 2,157,815 and 2,129,666 and German Patent Publication No. 2,353,702, which can be employed for monitoring, against unauthorized intrusion, certain surfaces, terrain or spaces or areas. Such systems provide intrusion supervision along a periphery, however only along linear paths. Additionally, they are afflicted with the drawback that the equipment needed for such purpose must be erected at the periphery of the monitored terrain or space or the like. Hence, it is possible by, for instance, intentionally or maliciously tampering with the equipment to impair its effectiveness, or else by carefully observing the functioning of the system to take counter measures for fooling the same. There have also been proposed in the art space monitoring systems wherein, at a space which is to be supervised or monitored, there is produced a radiation field. Sensors are provided which are responsive to field changes, as the same are caused by objects, such as intruders, invading the space or area and, in consequence thereof, trigger an alarm. Significant in this regard are the following prior art references: German Patent Publication No. 2,346,764, German Patent Publication No. 2,508,796 German Patent Publication No. 2,600,362, German Patent No. 2,613,375, German Patent No. 2,617,467, German Patent No. 2,638,337, German Patent No. 2,656,256, German Patent Publication No. 2,702,499 and German Patent Publication No. 2,722,982.

Prior art methods and equipment are capable of satisfactorily accomplishing certain objectives or tasks. However, as a general rule they are afflicted with the drawback that, if they are set to possess adequate sensitivity, apart from tripping the desired alarms, they also can be caused to trigger false alarms by the action of some other effects. Such system operation is, however, unsatisfactory on a continuing basis, since upon frequently triggering false alarms the confidence in the reliability of such method and its equipment oftentimes is so shaken or impaired that, with time, there is a tendency not to take too seriously the triggering of an alarm.

SUMMARY OF THE INVENTION

Therefore, with the foregoing in mind it is a primary object of the present invention to provide a new and improved construction of intrusion detection method and apparatus which is not readily susceptible to triggering of false alarms, possesses high integrity in monitoring a region, meaning a surface, area or space or the like which is to be supervised or protected, and operates in a manner that it is extremely difficult to fool the monitoring method and equipment.

Another and more specific object of the present invention aims at the provision of a new and improved method which affords an extremely reliable surface, terrain, area or space monitoring, essentially is immune against intentional attempts to impair the function and operational integrity of the equipment, additionally, notwithstanding its extremely high sensitivity has an exceptionally small rate of triggering false alarms, and further, also is suitable for monitoring relatively complicated structures or configurations of surfaces, terrains, areas, spaces or the like.

Another significant object of the present invention aims at the provision of a new and improved construction of intrusion protection apparatus which is extremely reliable in operation, not readily subject to breakdown or malfunction, requires a minimum of maintenance and servicing, while affording high security against unauthorized intrusion into a protected region, whether such be a surface, terrain, area, space or room or the like, and wherein the system design is such that it is virtually impossible, but at the very least extremely difficult, to undertake counter measures for fooling the equipment and its mode of operation.

In the context of this disclosure and especially the claims the term "space" or "region", whenever the context permits, is used broadly to encompass surfaces, areas, terrains, expanses, rooms or the like, which are to be monitored or supervised.

Now in order to implement these and still further objects of the invention, which will become more readily apparent as the description proceeds, the inventive method for space monitoring by means of pulsed directional beams is manifested by the features that, there are determined certain points in the space and there is thus defined at least one virtual line or virtual surface. By means of such virtual line or virtual surface a surface is split or divided into partial surfaces or a space into partial spaces. These partial surfaces or partial spaces each have allocated therewith a certain significance. By means of measuring beams which possess a point-shaped or punctiform expanse at the virtual line or virtual surface or at an object to be detected, there can be directly or indirectly determined at least one parameter for identification of at least one object, and the measuring beams are transmitted in defined directions.

As mentioned previously, the invention further concerns novel apparatus for the performance of such space monitoring or supervising method, wherein there is provided a directional beam emitter comprising a pulse transmitter for transmitting pulsed directional beams in defined timewise sequence and defined directions. A receiver is provided for the spatially directed reception of reflected energy of the directional beam transmitted by the directional beam emitter. A computer serving as an evaluation device mathematically evaluates a multiplicity of reflection signals which have been received from different directions and/or reflection signals which should have been reflected but have not appeared.

The invention exploits the general inventive concept of continuously measuring a surface, region, terrain, space or area to be monitored, as mentioned generally simply generically referred to as a region or space, as concerns its condition and possibly arising changes. The obtained measuring results are evaluated, for instance compared with stored values. The measuring results also can be further processed, so as to thus obtain additional information, and this additionally obtained information can be compared with stored information, to thereby not only reliably determine changes which have arisen, but also to be able to evaluate such as concerns their position, nature and significance, for instance in order to only then trip an alarm when a detected change fulfils certain criteria.

In this way there is not only insured for reliable and exact determination of the condition and changes in condition of the monitored space, but it is also possible to limit the detection to certain objects or events. Consequently, it is possible to extensively avoid the bothersome frequent tripping of false alarms which arise with other state-of-the-art systems.

The method and apparatus for the performance thereof, as contemplated by the invention, have been found to be exceptionally immune against intentional counter measures for fooling the system, since the system parameters practically cannot be recognized or detected from externally, and cannot be influenced or fooled by external measures. Additionally, the equipment, in contrast to the aforementioned light barriers, significantly is not erected at the periphery or outer contour of the surface, region, space or area to be monitored, in other words, a supervised space, rather is arranged practically at the center or at least within the monitored region. Due to the relatively small and compact construction of the equipment and its comparatively large spacing from the periphery of the monitored region, it is easy to disguise or camouflage, and thus, it can be protected against intentional or malicious tampering from a distance or remotely.

The method and apparatus of the invention are not only effective for monitoring the most different spaces or the like, such as surfaces, terrains, areas or rooms, against disturbing, especially malicious or intentional intrusion, but also can be beneficially employed for other significant purposes, such as, for instance, for the continuous monitoring or supervision of terrain which tends to move or shift, such as land slides, earth movements and so forth, important structures or construction sites such as dams, all for the purpose of detecting changes which arise thereat. Also, the monitoring equipment and method is extremely suitable for safeguarding against burglary or other unauthorized intrusion into buildings or structures, such as houses, buildings, factories, plants, military installations and so forth, by virtue of its relatively uncomplicated construction and its extremely great flexibility concerning its field of application with respect to different types of structures. Due to the high resolution capability of the system and the rapid mode of operation thereof, it is equally possible to detect moving objects and their behavior reliably and with extremely great accuracy.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
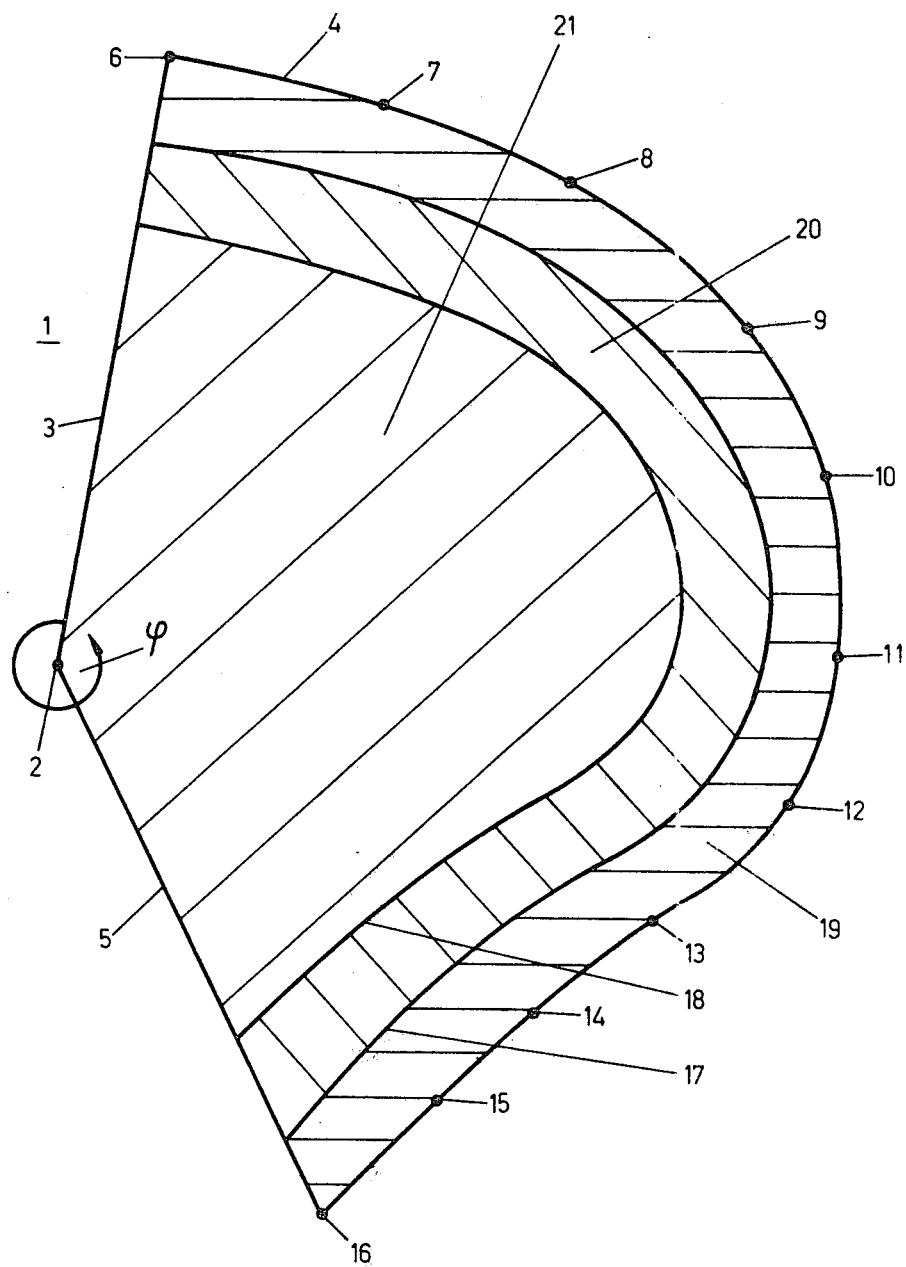
FIG. 1 is a plan view of a region to be protected, such as a surface or terrain, showing a possible arrangement of warning zones externally of a protective zone by means of virtual lines.

Describing now the drawings, in FIG. 1 there is shown a region to be supervised or monitored, illustrated for instance as a terrain or surface 1 which is bounded by a line 3 emanating from a point 2, a line 4 and a line 5 which leads back to such point 2. FIG. 1 illustrates such region, hereinafter simply generally referred to as the terrain or surface 1, in plan view. The line 4 extending between the boundary lines 3 and 5 is to be understood as constituting a virtual line, which does not appear physically within the terrain 1, yet is defined or fixed as far as its course or extent is concerned by data stored in a storage or memory, for instance by the polar coordinates of a number of points selected to lie upon such line 4 and related to the point 2, for instance the points 6 to 16. Between these selected points 6 to 16 the course of the virtual line 4 can be determined, for instance, by linear interpolation by means of a computer or according to a predetermined function, as will be explained more fully hereinafter. The second virtual line 17 can be freely chosen, for instance in a freely selectable, preferably constant spacing from the first virtual line 4 in the direction of the point 2.

A third virtual line 18 likewise can be freely chosen, for instance in a further freely selectable, preferably constant spacing from the second virtue line 17 in the direction of the point 2. By means of these virtual lines 4, 17 and 18 the surface area of the terrain 1 is divided into partial surfaces 19, 20 and 21, each of which can have allocated thereto a certain meaning or significance. Thus, for instance, the partial surface 19 may constitute a first warning zone, the partial surface 20 a second warning zone, and the partial surface 21 a protective zone. Each of the aforementioned partial surfaces 19, 20 and 21 therefore advantageously has allocated thereto a predetermined significance.

The point 2 constitutes the erection site for a directional beam transmitter to be considered more fully hereinafter, which, for instance, radiates narrowly focused electromagnetic radiation, for instance invisible light pulses of a laser light source, in a time sequence in different directions towards the terrain 1. Each of these pulses is radiated or transmitted at a defined point in time and in each case at a defined azimuth angle $\phi$ and elevation angle $\Psi$ in the terrain 1.

Point 2 also constitutes the erection site for a radiation receiver, also to be discussed more completely hereinafter, which, from the momentary direction of a radiation or beam pulse, preferably by being spatially and frequency selective to incoming radiation, i.e. reflected radiation, responds and evaluates such received reflected radiation. By means of each such transmitted beam pulse there is formed, in each case, a certain measuring beam which, as the case may be, is reflected at an object or by the terrain as the background. As a matter of convenience in this disclosure such measuring beam associated with a reflection will be designated as a direct measuring or measurement beam. On the other hand, if there does not occur any reflection, for instance because of complete or practically complete radiation absorption or because the transmitted beam or radiation is reflected or deflected away in another direction, then such measuring beam will be referred to hereinafter as an indirect measuring or measurement beam. As will be demonstrated more fully hereinafter, even in the event of indirect measuring beams, i.e., the absence of radiation reflection back to the receiver, it is possible to obtain significant information as concerns the condition of the monitored or supervised terrain, i.e., generally the region or space.

Based upon the showing of FIG. 2 there will be explained the conditions which prevail during the determination or fixing of certain points in a space or region for the definition of virtual surfaces at the space. The point 2 at the space has been chosen, as mentioned, at the site of erection of the directional beam transmitter. A space sector or region 22 extends outwardly from point 2. Its angular limits are defined by fixing certain points in the region or space, for instance by points 23, 24, 25 and 26. By means of these points 23, 24, 25 and 26 and possibly further points, for instance the points 27 and 28 and even further points, it is possible to define a randomly extending surface as a virtual surface 29 in the space or region 22. The spatial extent of the virtual surface 29 can be fixed between the aforementioned defined points by interpolation based upon a predetermined functional correlation. In corresponding manner it is possible to define further virtual surfaces, for instance by fixing the further points 30, 31, 32, 33, 34 and 35, and, if desired, with the aid of additional points, a second virtual surface 36.

Figure 2:
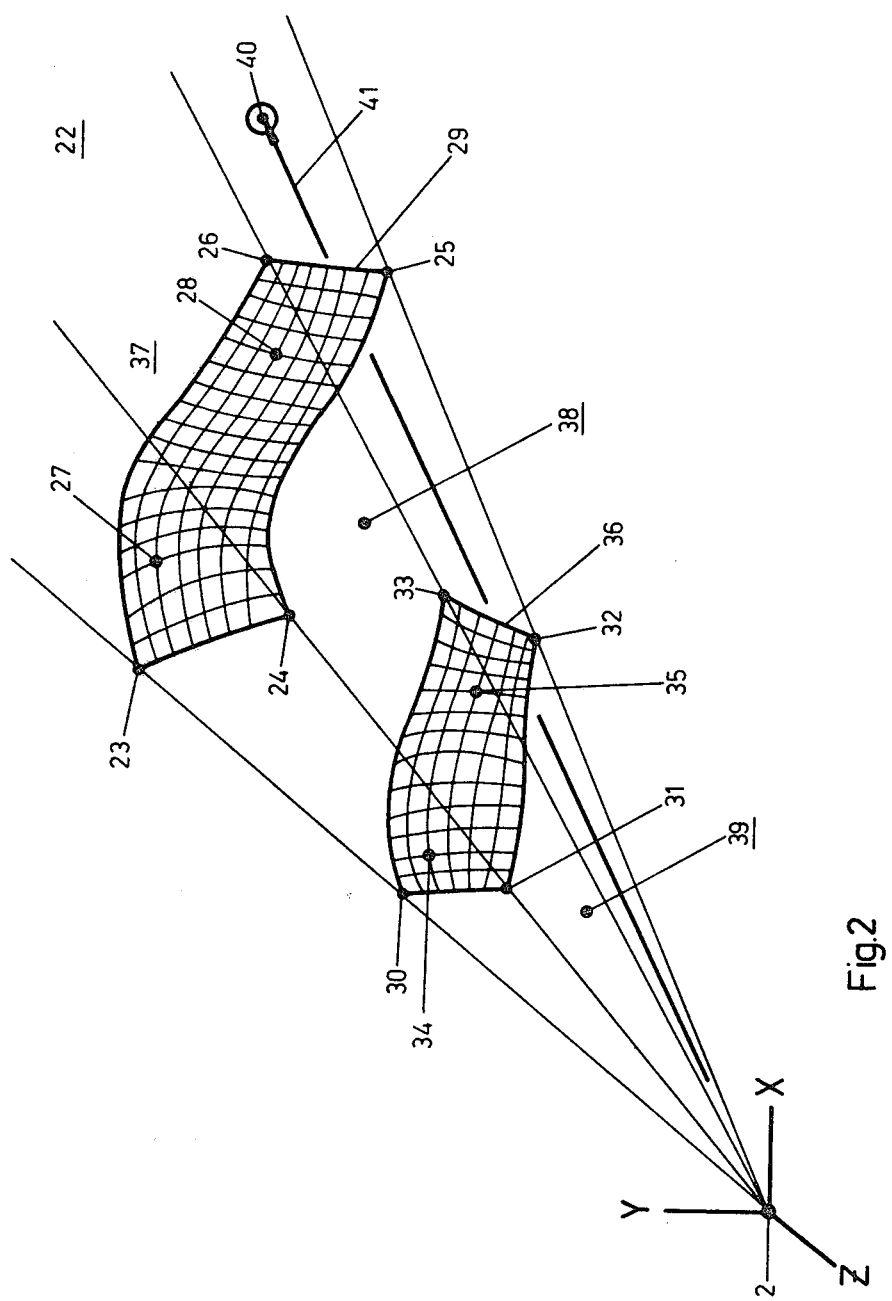
FIG. 2 is a perspective view showing the conditions prevailing with space monitoring with virtual surfaces for forming warning spaces and a protective space.

The virtual surfaces 29 and 36 have each been illustrated in FIG. 2 by a line grid or network.

The determination or fixation of the aforementioned points can be accomplished, for instance, by coordinates of each such point related to the coordinate sytem x,y,z, or by polar coordinates. These coordinates are stored in a suitable storage or memory. The aforementioned virtual surfaces 29 and 36 therefore do not physically appear in the space or region, they are so-to-speak "imaginary" surfaces, by means of which it is possible to divide the space sector 22 into partial spaces or regions.

Each partial space has allocated thereto a certain significance. For instance, the outermost partial space 37 may be considered to constitute a pre-warning space or region, the intermediate partial space or region 38 a warning space, and the innermost partial space or region 39 a protective space. With a predetermined sequence of measuring beams, defined as a function of time and in relation to azimuth and elevation, and which beams emanate from the erection site or point 2 of the directional beam transmitter, there is scanned and measured the space sector 22. An object 40 located in the space sector 22, or, in the case of a larger size object a portion thereof, will be impinged once or repeatedly by measuring beams of a predetermined direction. Each measuring beam is a narrow radiation beam, the cross-section of which at the object or at the virtual surfaces, can be considered to be punctiform or point-shaped. Thus, under the expression "punctiform" or "point-shaped" it is to be understood that the cross-sectional area of the beam is small in relation to the dimensions of the object to be detected. This also means that the smallest possible cross-sectional area also can be considered to be punctiform if the object to be detected is even smaller. However, in this case it is not possible to make any statements concerning the actual size of the object, although the object still remains discernible.

At the receiving end of the system it is possible, by measuring the travel or transit time of the beam or radiation between the directional beam emitter and the object 40 and back again to the receiver, to determine at least one parameter, for instance the distance of the object from the directional beam emitter or the location of the object. Based upon the timewise sequence of the measuring beams and their azimuth angle and elevational angle, and thus, the different measuring values, it is possible to directly detect an object 40 (FIG. 2) and/or its shape. If there is located within the monitored space or region an object having a surface which practically completely absorbs the radiation, then, due to the sudden absence of radiation reflections at the background it is nonetheless possible in an indirect manner to determine the presence, the angular position, the shape and further information concerning such object by processing the direct measuring beams from the immediate neighborhood of such object. The same considerations are analogously valid even when monitoring a terrain or surface as indicated in FIG. 1.

Since the mentioned virtual lines 4, 17 and 18 (FIG. 1) and the mentioned virtual surfaces 29 and 36 (FIG. 2) are defined by storing correlated coordinates or by interpolation computations based upon functional correlations, they can be defined either fixedly at the terrain or at the space. The coordinates are then constant values related to the direction site or point 2 of the directional beam transmitter, or they also can have a position which varies as a function of time by the input to the storage of appropriate values varying with time.

The erection site or point 2 of the directional beam transmitter can be variable as a function of time, i.e. the directional beam transmitter can be movable with regard to its coordinates. Also, in this case, the coordinates of the virtual lines or the virtual surfaces, now related to the movable point 2, can be constant or, however, variable as a function of time.

Such timewise variations of the virtual lines and virtual surfaces make it exceedingly difficult to carry out any operations or manipulations which possibly might intentionally fool the monitoring system, in that it is not possible to detect or predict from externally either the position of the virtual lines and virtual surfaces or their changes. Even information previously obtained from prior experiences concerning the former location of virtual lines or virtual surfaces are of no value for any contemplated fooling of the space monitoring system, if, as previously mentioned, the location or site parameters of the virtual lines and/or virtual surfaces are chosen to vary as a function of time.

If an object which has been detected by the measuring beams moves, then by mathematical processing of the measured values or results, i.e. the transit times, as such are represented by the distance vectors of the measuring beams, it is possible to determine not only information concerning the size and shape or configuration and position of the object, but also movement criteria of the object. Such movement criteria relate to the path of travel or trajectory of the object, its speed and acceleration.

Figure 3:
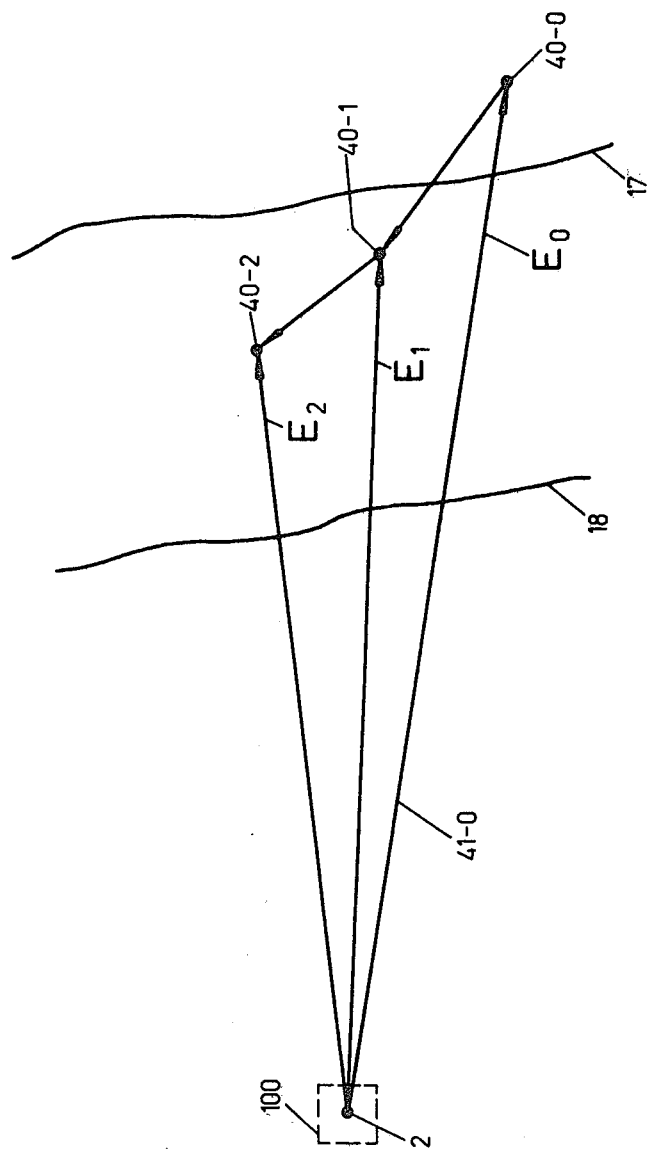
FIG. 3 illustrates an example of measuring a moving object within a terrain.

In FIG. 3 there is shown an exemplary embodiment of equipment for measurement of a moving object 40 by means of successive measuring beams 41. At the time $t = t_0$ the object 40 is initially struck at position 40-0 by measuring beam 41-0. It is possible to calculate the coordinates of the momentary position of the object 40 which is hit by a measuring beam, by means of the momentary distance of the object 40 to the erection site 2 of the directional beam emitter 100. These coordinates can be computed based upon the transit time of the radiation energy emitted from the directional beam emitter 100 to the object 40 and back again to the receiver and the azimuth angle $\phi$ and elevation angle $\Psi$ which can be determined on the basis of the construction and mode of operation of the directional beam transmitter for each point in time, especially for each individual one of the successive measuring beams.

A vector $E_0$ thus defines the position 40-0 where there is located the object 40 at the time $t_0$.

Analogously, a vector $E_1$, by virtue of its length and its azimuth angle and elevation angle, defines the position 40-1 of the object 40 at the point in time $t_1$.

Further, a vector $E_2$ by virtue of its length, azimuth angle and elevation angle defines the position 40-2 of the object 40 at the time $t_2$.

The aforementioned vectors $E_0$, $E_1$, $E_2$ are thus a function of the time and the angles $\phi$ and $\Psi$.

Predicated upon the measuring beams or vectors, i.e. the different positions 40-0, 40-1 and 40-2, tracking a certain object, it is possible to thus mathematically obtain information regarding the movement, i.e. the path of travel or trajectory and/or the velocity and/or the acceleration as movement criteria of the object 40. The required computation can be continuously performed in known manner by means of an electronic computer.

Based upon stored data there is also defined the course of virtual lines, for instance the virtual lines 17 and 18 (compare FIG. 1) and such can be infed to the computer. It should be apparent that with appropriate programing of the electronic computer there can be timewise and spatially calculated and indicated the passing of such virtual lines 17 and 18 by an object 40 as the point of intersection of the curve representative of the path of travel of the object 40 with the virtual lines 17 or 18.

In analogous manner it is thus also possible with a spatial arrangement, as shown in FIG. 2, for the penetration of virtual surfaces 29 and 36 to represent the boundaries of warning and protective areas, and by mathematically evaluating a sequence of defined measuring beams to also determine the entry of one or a number of objects into such zones. Also the residence time of the measured objects in such zones or spaces can be determined by mathematical evaluation of the relevant measuring beams.

While previously it was assumed that the object to be measured was small in relation to the focal point, i.e. the momentary cross-section of a beam or radiation bundle belonging to a measuring beam, that is to say in the event the object was stationary, it was not hit by two or more successive measuring beams, it will be now assumed that the object 40 to be measured is one having considerably larger dimensions such that it is struck by a multiplicity of measuring beams, the directions of which, in each instance, are known.

By mathematical evaluation of such multiplicity of measuring beams and the vectors resulting from the relevant object 40, it is possible with appropriate programing of the computer to not only compute criteria concerning object size, shape, configuration, but also as concerns the movement behavior, such as direction, velocity, acceleration, periodicity and so forth. By comparison of such criteria or data with stored data concerning size, shape, configuration, movement behavior, such as direction, velocity, acceleration, periodicity, and so forth of known objects, it is possible, in the presence of at least approximate data coincidence, to recognize the measured objects and to identify the same and, for instance, to allocate thereto a certain object classification or category.

Generally, the method enables the determination of all objects which move past a virtual line or penetrate a virtual surface or are located in one of the partial surfaces or partial spaces previously discussed.

The differentiation between undesired or disturbing objects and tolerable objects is dependent upon the local resolution capability of the system, i.e. the method operations and apparatus with respect to such object and the extensiveness of the program of the computer. Theoretically, one hundred percent differentiation is possible.

It is therefore also possible, according to this method, and with the apparatus to be still hereinafter described in detail, by means of condition parameters of a monitored surface or monitored spaced which have been infed by the computer, to monitor such surface or such space both as concerns conditions remaining the same and also with respect to any condition changes thereof. Hence, it is also possible to evaluate changes which have been determined in accordance with predetermined criteria by appropriately programming the computer, and to indicate the same and, if desired, to trip an alarm.

It is here mentioned that the determination of the aforementioned vectors and the different mentioned evaluations and comparison of criteria with stored information constitute computation operations which can be readily carried out by appropriately programing standard commercially available computers. The nature of the program will be readily evident from the function described herein, and therefore need not be explained more fully beyond the comments made herein, since computer software does not constitute subject matter for which protection is solicited.

Figure 4:
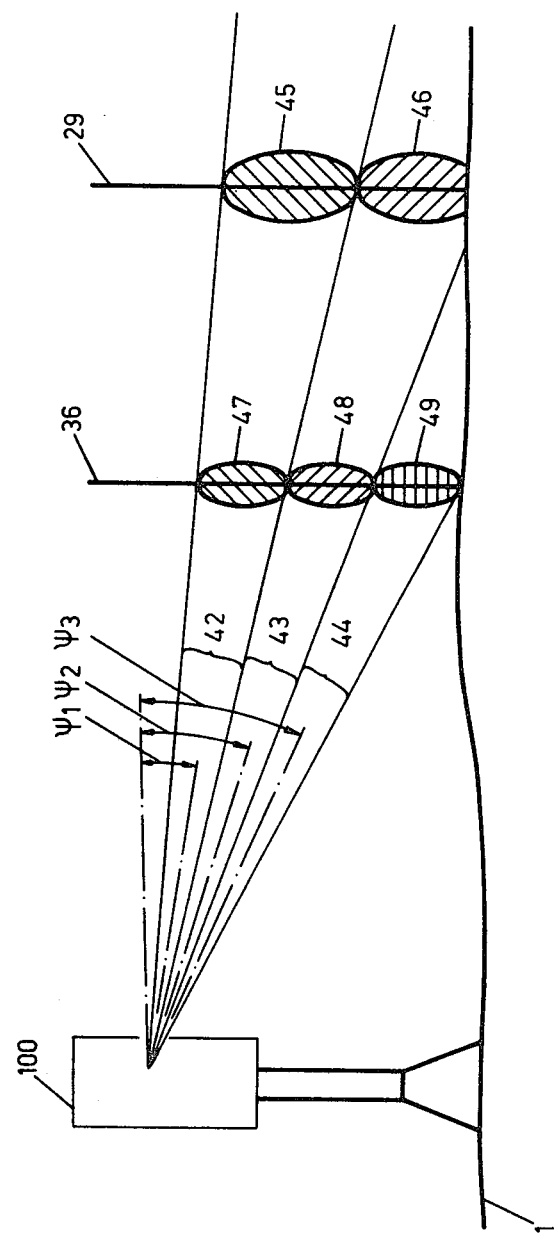
FIG. 4 is an elevational view illustrating directional beams and virtual surfaces.

Continuing, now FIG. 4 is a side view, in schematic illustration, for explaining the height of vritual surfaces with visibly shown focal points.

The directional beam transmitter 100 transmits beam or radiation pulses in a defined sequence as a function of time in alternate directions. In the side view of FIG. 4 there will be recognized the terrain or surfaces 1 and the radiation beams or bundles 42, 43 and 44, the respective momentary main beam or ray of which has an elevation angle $\Psi_1$, $\Psi_2$ and $\Psi_3$, respectively.

In this example the first virtual surface 29 is assumed to be a vertically extending surface. A second virtual surface 36 is likewise assumed to be a vertically extending surface, however having a smaller spacing from the directional beam transmitter 100. At the virtual surfaces 29 and 36 there are defined, by means of the radiation beams 42, 43 and 44, the focal spots 45, 46 and 47, 48, 49 respectively. These have been only schematically indicated in FIG. 4 by shaded ellipses, whose dimensions are dependent upon the divergence of each radiation beam and the distance from the directional beam transmitter 100. In the event that the directional beam transmitter 100 operates with light pulses, then there can be employed a controllable variable focus lens or so-called vario-optic, whereby it is possible to control the size of the focal spots according to a program which has been infed to the computer, for instance as a function of $\phi$ and/or $\Psi$.

The size of the focal spots determines, among other things, also the resolution capability. To obtain an adequate monitoring security it is therefore advantageous to select the divergence of the radiation, the elevation angle $\Psi$ and the azimuth angle $\phi$ of the individual measuring beams and their sequence as a function of time, in a manner such that there occur only negligible local and timewise gaps between the focal spots.

The method can be performed both with a single directional beam emitter, the radiation direction of which is variable, and also with a number of directional beam emitters which irradiate their radiation in different directions. The different radiation directions can be accomplished, for instance, either by providing a movable arrangement of the transmitter itself or by providing movable radiation deflection elements which are operatively associated with such transmitter.

It is however possible to realize a directional beam emitter in that, at least one transmitter is arranged followed by a beam splitter or divider system for the surface and/or spatial splitting or fanning of the radiation or beam. With such system there is then transmitted in different defined directions, for instance pulsed electromagnetic radiation, especially light radiation, for instance infrared radiation, in different defined directions, and the radiation reflected at the objects or background is infed to at least one receiver by means of one or a number of analogous radiation fanning or splitting systems and evaluated. The reflected radiation is thus received preferably spatially selective.

If the energy transmission occurs in succession as a function of time in different directions, then the corresponding reflected radiation protions are preferably likewise received in succession and individually evaluated. Then there is realized a transmission channel for the transmission of the radiation and a receiver channel for the spatially selective reception of the reflected radiation and for its further transmission to the receiver. These channels are preferably decoupled with respect to one another, in order to prevent spill-over of transmitted radiation from the transmission channel directly into the receiving channel. This is strived for in consideration of the large signal peak difference in both channels, so that the receiver can be protected against input over-excitement.

For particular applications, for instance monitoring a number of discrete surfaces while using only one transmitter and receiver, it is advantageous to transmit radiation pulses according to a predetermined program in groups in different directions and to receive in groups reflections in each case from the aforementioned directions and also to evaluate such received reflections in groups.

If radiation or beam pulses are transmitted in groups in different directions and received in groups from such directions, then it is not necessary to individually evaluate each signal from each direction. If, namely, there occurs in the radiation splitting region, for instance due to an intruding object, a change in the reflection properties, i.e. reflection of at least one of the split or fanned beams to a different location than before, then also with common evaluation of an entire group of signals there occurs in the thus obtained summation signal a change. This change of the summation signal, in relation to the undisturbed condition, can be beneficially employed as the criterion for alarm tripping.

If there are employed at least two radiation or beam splitting systems, each with a surface-like fanning of the radiation in different surfaces, in other words staggered spatially, then an object moving through at least two surfaces causes timewise staggered changes of the received signals. Consequently, by evaluating the timewise difference and the sequence of the change of the output signal in the at least two systems, it is possible to determine the direction of movement of an intruding object and such can be employed as a further criterion for the directional-dependent alarm tripping or triggering.

Basically, the method can be used with all energy which is irradiated as pulses, for instance ultrasonic energy, especially however also electromagnetic energy. There is preferably suitable pulse-shaped laser radiation and especially in the region of invisible light, for instance in the infrared region.

According to a given field of application it can be advantageous for the purpose of as gapless covering as possible of a virtual surface with focal spots, that the focusing of the radiation is controlled as a function of the momentary direction.

In consideration of controlling the dynamics of the receiver system i.e., the faultless processing of both very weak and also very strong signals, it also can be advantageous in certain situations to control the transmission output and/or the receiver sensitivity as a function of the radiation direction.

However, it is also possible for this purpose to control the transmission output and/or the receiving sensitivity as a function of the magnitude of the measuring beams or the distance vectors and/or the intensity of the reflection.

The method also can be designed such, according to further aspects thereof, that not only are there evaluated the distance vectors, but also the intensity of the radiation reflected to the receiver. For instance, in this manner it is possible to detect certain objects based upon their greater reflection capability in contrast to other objects and/or in contrast to the background. Their related measuring data, obtained from their distance vectors, can be specially processed or evaluated, based upon the additional evaluation of the higher intensity of the reflected radiation infed to the receiver. It is also possible to obtain an appreciable data reduction if the computer and the storage only have inputted thereto such selection of data which, based upon the greater intensity of the reflection, is at least periodically of particular interest.

The evaluation of the received vectors thus is limited, for instance, as concerns site of the reflection and/or movement behavior of the relevant object, only to a desired number of objects.

This selection can be accomplished, for instance, by the arrangement of a conventional threshold value device in the receiving channel and/or by an intentional, at least temporary, reduction of the transmission output of the directional beam emitter and/or the receiver sensitivity in relation to normal operation.

It is also possible for the determination of certain points at the terrain or space, for instance selected points of virtual lines and/or virtual surfaces which are to be fixed, to temporarily arrange at the relevant locations of the terrain or space highly reflecting objects, in particular for instance, so-called retro-reflectors, to then measure at such the reflected radiation or energy in the manner heretofore described and to store the thus obtained coordinates of the erection site of these particularly strongly reflecting objects i.e. retro-reflectors for the purpose of determining the virtual lines and/or virtual surfaces.

It is also possible to employ the method in conjunction with traffic monitoring. For instance, a virtual line or virtual surface can be fixed transversely with respect to a traffic lane, and there can be determined passing through or penetration of such virtual line or virtual surface, and the relevant data evaluated and for instance counted or recorded.

The method also can be employed for many different fields of application as concerns traffic monitoring; thus for counting traffic, evaluating traffic conditions, for instance traffic jams on highways or freeways, controlling traffic regulation installations, controlling parking garages, monitoring vehicles where the driver has violated a traffic signal, for instance crossed a red light and so forth.

Generally speaking, it can be stated that the method for monitoring a surface or space is suitable both for constant and changing conditions, wherein both the fact that the condition remains constant and also the fact that the condition changes can be beneficially evaluated and/or indicated. Thus, there can be monitored, continuously or periodically as to its condition, for instance, as the object a terrain slope or face of a mountain which is prone to the danger of an earth slide, a structure such as for instance a dam wall or a dam, a bridge and so forth. If there arise impermissible changes, these can be detected, recorded or reported by sounding an alarm.

In order to solve these special functions it is advantageous to fix a virtual line or virtual surface so as to lie at least approximately at the surface of the monitored object, for instance a structure. Changes then have the effect that, for instance, at least part of the surface of the monitored object or structure penetrates into another partial surface or another partial space. This is indicated by an appropriate output signal of the computer, so that, if desired, an alarm can be triggered.

Figure 5:
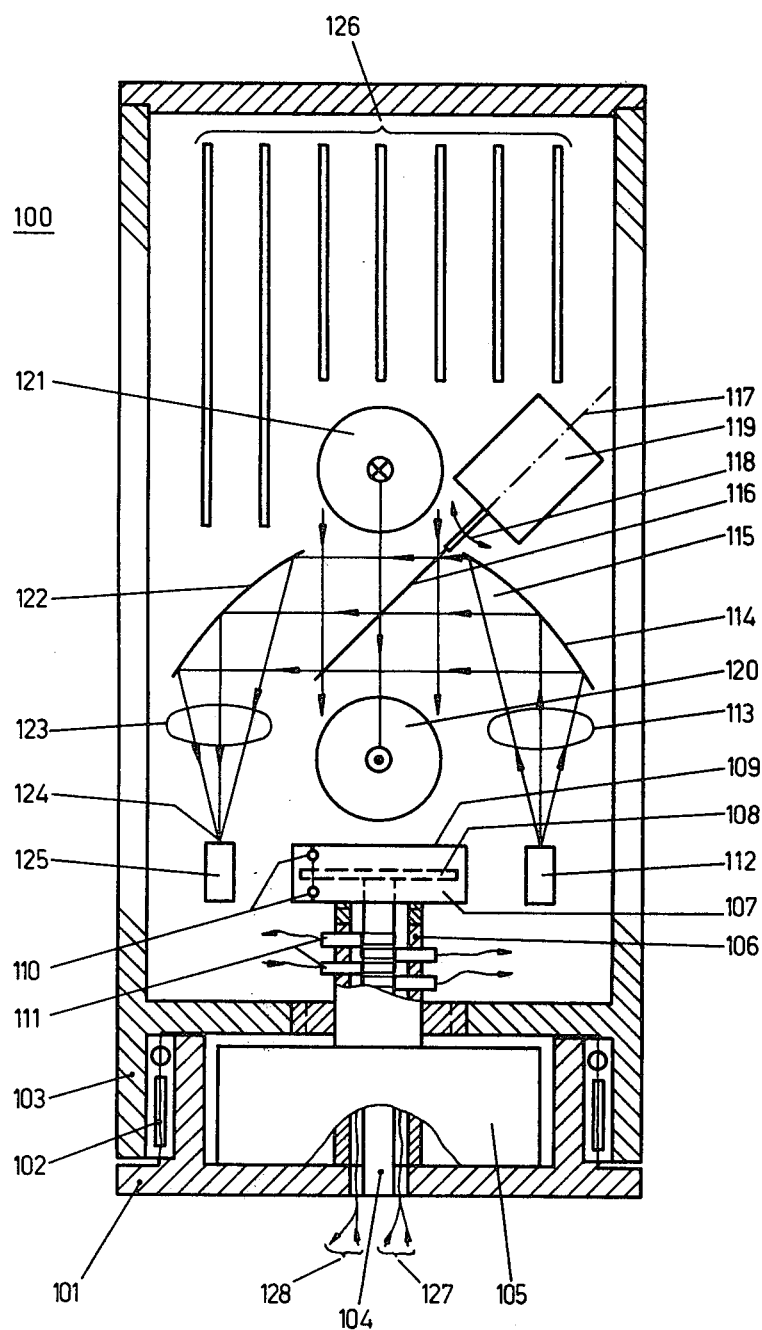
FIG. 5 is a sectional view of a directional beam emitter used in practising the invention.

Continuing, by referring to FIG. 5 there is shown therein, in sectional view, a first exemplary embodiment of a directional beam emitter. In such FIG. 5 reference character 100 designates the directional beam emitter in its entirety, in other words, it encompasses not only the transmitting section but also the receiving section together with the related auxiliary devices.

The directional beam emitter 100 will be seen to comprise a lower portion 101 which is attached at the erection site or location 2 (FIGS. 1, 2 and 3). At the lower section or portion 101 there is rotatably mounted, by means of a needle bearing arrangement 102 or equivalent structure, an upper portion or section 103 for rotation about a stationary shaft or axle 104.

A drive device or drive 105, arranged at the lower portion 101, drives, by means of a hollow shaft 106 and a coupling not particularly shown in FIG. 5, the upper portion or section 103. This upper portion or section 103 is rotated, for instance, at twelve revolutions per second about the fixed shaft 104.

An example of a rotational transmitter 107 will be seen to comprise, on the other hand, a rotational transmitter disk 108 rigidly connected by means of the shaft or axle 104 with the lower portion 101, and which transmitter disk 108 is stationary in relation to the lower portion 101, and, on the other hand, further contains sensors 110 connected with the housing 109 of the rotational transmitter 107, as has been merely schematically indicated in FIG. 5. Since the housing 109 of the rotational transmitter 107 is rigidly connected with the upper portion or section 103 of the directional beam emitter 101, it rotates together with the sensors 110 about the shaft or axle 104, and thus, moves relative to the lower portion or section 101 and the therewith rigidly connected rotational transmitter disk 108.

By means of the rotational transmitter 107 and its sensors 110 it is therefore possible to infeed to a computer, at any moment in time, the instantaneous relative rotational position of the upper portion 103 as a measurement value emanating from the sensors 110, by means of the lines connected with slip rings 111.

In the rotatable upper section or portion 103 there are mounted further components necessary for the operation of the directional beam emitter 100. A pulse transmitter 112, for instance a laser diode transmitter for the outfeed of pulsed infrared radiation, the latter being designated in FIG. 5 by a diverging transmitted light beam 113, transmits such radiation by means of a first optical system 114, for instance a parabolic mirror, in the form of a substantially cylindrical parallel ray-radiation beam or bundle 115, of essentially circular cross-section and extending horizontally until the image beams, towards a movable beam deflection element 116, for instance towards the lower side of an oscillating mirror 116 which is reflectively coated at both sides or faces.

The beam deflection element 116 is pivotable about a shaft 117, inclined with respect to the horizontal through 45°, as a function of time through exactly defined angular values in the sense of the double-headed arrow 118. For pivoting of the beam deflection element 118 the same is provided with a suitable pivot mechanism or device 119 which is rigidly secured at the upper portion 103. In order to reduce the moment of inertia of the movable beam deflection element 116 it is also advantageous to impart to the oscillating mirror 116 an elliptical configuration or shape, wherein the major axis extends in the direction of the axis 117 and the minor axis transversely thereto in the plane of the oscillating mirror 116. These measures facilitate the attainment of high deflection frequencies.

The parallel ray beam 115 is thrown or reflected by the radiation deflection element 116, in the present case by the underside of the oscillating mirror 116, downwardly onto a deflection mirror 120. This deflection mirror 120 is inclined with respect to the horizontal through an angle of about 45°, and constitutes a second optical means which is rigidly connected with the upper portion 103. The deflection mirror 120 has a surface which is turned by 90° in relation to the null position of the surface of the beam deflection element 116, i.e. the oscillating mirror. The deflection mirror 120 propels the light which is infed thereto by the beam deflection element 116 in horizontal direction, in other words perpendicular to the plane of the drawing of FIG. 5, in the form of a measuring beam towards the front; in FIG. 5 such has been shown as a small circle having a center located at the deflection mirror 120. The measuring beam departs to the outside by means of a standard window provided at the upper portion 103 and not particularly shown in FIG. 5. If the beam deflection element 116 oscillates, as described, then the beam which is forwardly deflected by the deflection mirror 120 rocks or pivots relative to the upper portion 103 of the directional beam emitter 100 in a vertical plane. Since now, however, as described, the upper portion 103 and thus also the first optical means, in other words the parabolic mirror 114, the beam deflection element 116 and the second optical means, here the deflection mirror 120, co-rotate along with the upper portion 103, the aforementioned vertical plane rotates the transmitted light, emanating from the upper portion through a window thereof, likewise about the shaft 104. Hence, by knowledge of the point in time of the transmitted light pulse and the related rotational position of the upper portion 103, it is therefore possible to exactly define the momentary azimuth angle $\phi$ and by means of the momentary pivotal position of the oscillating mirror of the oscillating deflection element 116 it is possible to exactly define the momentary elevation angle $\Psi$ of each individual measuring beam of the directional beam emitter 100.

There also can be used as the first optical means 114, instead of the parabolic mirror, a so-called vario-optical means or variable focus lens having a deflection mirror, enabling a controlled variation of the focusing of the transmitted light beam 113, and thus, also the outwardly propogated measuring beam.

The light of the measuring beam which has been reflected at the outside arrives by means of a further window of the upper portion 103, which window has not been particularly shown in FIG. 5, at a second deflection mirror or reflector 121 which is inclined with respect to the horizontal. In FIG. 5 the received light bundle or beam has been shown at the deflection mirror 121 in the form of a circle having a cross. From the second deflection mirror 121, the received light bundle or beam arrives perpendicular downwardly at the upper side or face of the beam deflection element 116, here the oscillating mirror, which, as will be recalled, is reflectively coated at both sides or faces, and from that location, by means of a further parabolic mirror 122, in the form of a converging received radiation beam 123, at a receiver 125. The further parabolic mirror 122 preferably coacts with a narrow-band interference filter 124 for suppressing the effects of foreign or spurious light. The receiver 125 converts the received radiation into electrical signals or pulses which are processed by a computer, as will be explained shortly.

Mounted at the directional beam emitter 100, for instance at the upper portion 103, are also the related auxiliary devices which are normally needed, such as current or power supply elements, control and regulation devices for the drive 105 and the pivot device 119 as well as the components of the computer. This has been illustrated in FIG. 5 by a series of symbolically shown electronic plug cards 126.

By means of the lines or conductors 127 the directional beam emitter 100 is powered with electrical energy, for instance from an alternating-current power supply network or from a battery or other suitable power supply. By means of further lines or conductors 128 the directional beam emitter 100 delivers the output signals which have been processed thereby, for instance in a coded form. These output signals can be utilized in conventional manner, for instance, as condition reports and/or alarm reports for display or indication purposes.

It is here further still to be mentioned that the measuring beams 41 (FIGS. 2 and 3) or 42, 43, 44 (FIG. 4), delivered by the directional beam emitter 100 in accordance with the pulse train frequency of the pulse transmitter 112, produce focal spots 45, 46, 47, 48, 49 (FIG. 4) at the region of the virtual lines or virtual surfaces 29, 36 (FIG. 3). In this respect it is advantageous, on the one hand, to select or control the size of such focal spots and, on the other hand, the pulse repetition frequency of the pulse transmitter 112 such that such focal spots are produced in succession and in successive circumferential regions, accomplished by the rotation of the directional beam emitter 100, and by the varying vertical deflection of the measuring beams, accomplished by the beam deflection element 116, there is possible covering of the selected virtual surfaces as free of gaps as possible. When using a light transmitter, also infrared light, as the pulse transmitter 112, it is advantageous to regulate the size of the focal spots, by means of a regulation and control unit operatively associated therewith, for instance along the first virtual surface as a function of their momentary distance from the directional beam emitter 100.

Figure 6:
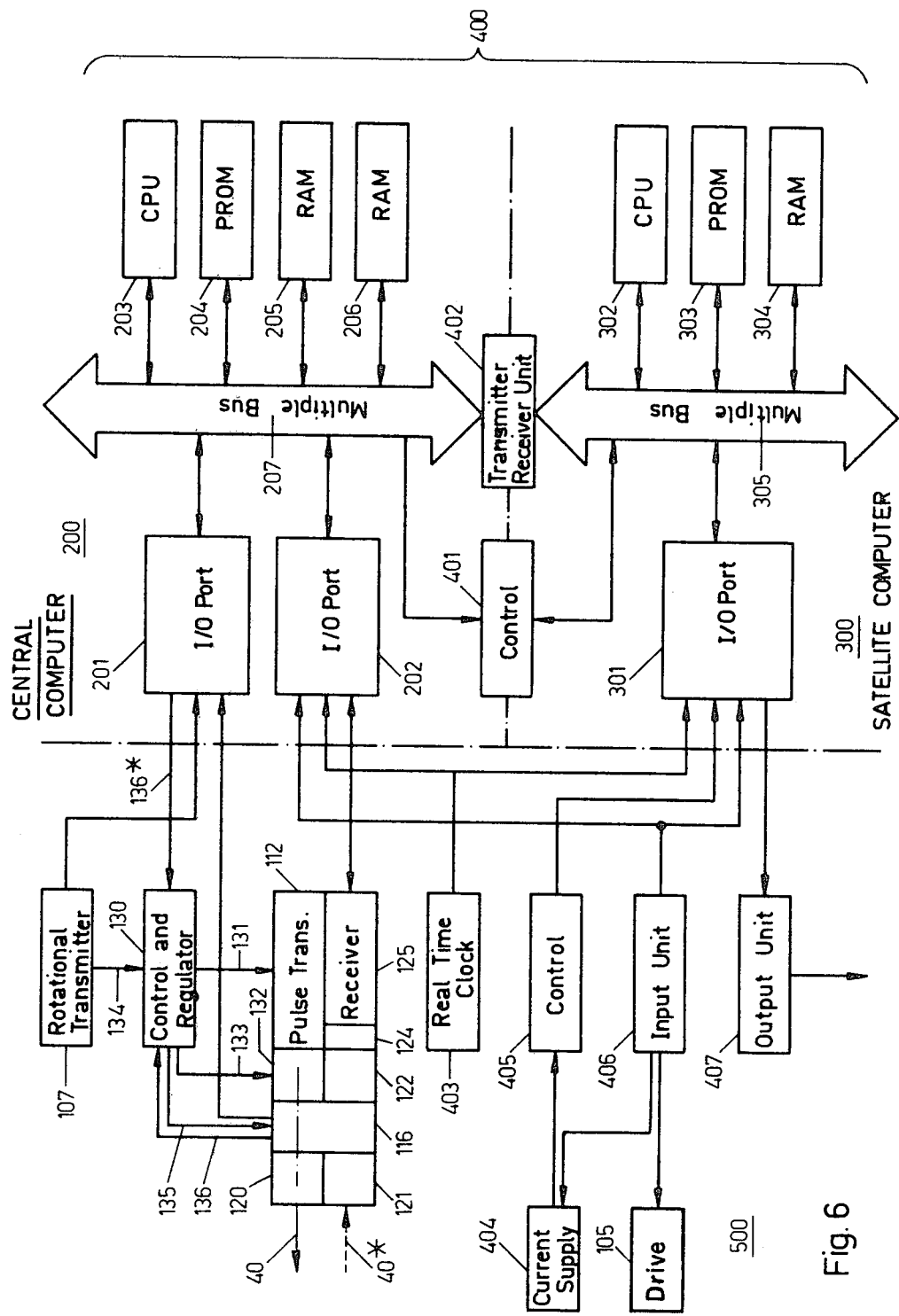
FIG. 6 is a block circuit diagram of apparatus for performing the method.

FIG. 6 is a block circuit diagram of an exemplary embodiment of apparatus for the performance of the inventive method. The pulse transmitter 112 transmits laser pulses in the infrared region, the pulse repetition frequency of which is controlled by a regulating and control unit 130 by means of a line or conductor 131. The transmission pulses of the pulse transmitter 112 pass through a variable focus lens or varioopticl system 132, the focusing of which is controlled by the regulation and control device 130 by means of a control line 133. The transmission pulses are then deflected by the beam deflection element 116 in accordance with its momentary position and infed to the deflection mirror 120. The deflection mirror 120 deflects the transmission pulses, as a measuring beam 40, in a direction defined by azimuth $\phi$ and elevation $\Psi$ in accordance with the momentary rotational position of the directional beam emitter 100 and the momentary pivotal position of the beam deflection element 116. The resultant transmitted light beam is focused in accordance with the momentary setting of the variooptic system 132.

Based upon the data infed to the regulation and control device 130 by the rotational transmitter 107 by means of a line 134 and by the beam deflection element 116 by means of a line 136 and also the data infed from a central computer 200 which is received from a line or conductor 136*, the regulation and control device 130 controls the correct position of the beam deflection element 116 in order to direct the measuring beam 40 exactly in a defined direction $\phi$, $\Psi$. To improve such control operation a line or conductor 135 leading to the control and regulation device 130 delivers data regarding the actual position of such beam deflection element. The central computer 200 is a commercially available computer, such as Single Board Computer iSBC 86/12 of Intel Corporation, Santa Clara, Calif.

The received light 40* reflected by the background of the monitored terrain 1 (FIG. 1) or space 22 (FIG. 2) or from an object 40 (FIGS. 2 and 3) arrives, by means of the second deflection mirror 121, the beam deflection element 116 and the further parabolic mirror 122, through the narrowband interference filter 124 at the receiver 125. By virtue of the selected construction of the directional beam emitter 100, the same has been disclosed by way of example with reference to FIG. 5, there is insured that the receiver equipment containing the components 121, 116, 122, 124 and 125 always is aligned exactly in the opposite direction than the transmitted measuring beam 40.

Now in order to be able to perform the method of the invention by means of the directional beam emitter 100 the latter contains a computer 400 composed of the mentioned central computer 200 and a satellite computer 300 and a group of auxiliary devices 500 operatively associated with the computer 400. The satellite computer is likewise a commercially available computer, such as Single Board Computer iSBC 8/20 of Intel Corporation.

The central computer 200 comprises a first input/output unit (I/O-port) 201 and a second input/output unit (I/O-port) 202, and, additionally, a central processor unit (CPU) 203, a programmable storage or memory (PROM) 204, a first read-write memory with random access (RAM) 205, and a second write-read memory with random access (RAM) 206. All of these components are connected in know manner with one another by means of a first multi-bus (BUS) 207 or can be brought into operative connection with one another.

The satellite computer 300 comprises an input/output unit (I/O-port) 301, furthermore a central processor unit (CPU) 302, a programmable storage or memory (PROM) 303 and a write-read storage with random access (RAM) 304. Here also, all of these components can be interconnected or brought into operable interconnection with one another in conventional manner by means of a second multiple-bus (BUS) 305.

The central computer 200 and its multiple-bus 207 and the satellite computer 300 and its multiple-bus 305 have operatively associated therewith a common bus-control unit 401.

Between the first multiple-bus 207 of the central computer 200 and the second multiple-bus 305 of the satellite computer 300 there is arranged a transmitter-receiver unit (transceiver) 402 for data traffic between both of the buses 207 and 305 and between the central computer 200 and the satellite computer 300.

The following auxiliary devices are operatively correlated with the computer 400: a real time clock 403, which is provided both as the time or frequency base for the rotational transmitter 107 and the control and regulation unit 130 and also for the control of the aforementioned computer 400. There are also provided the current supply components 404 with the associated control unit 405, an input unit 406 both for turning-on and turning-off the directional beam emitter 100 and also for the selection of the desired operating state. By means of this input unit 406 there also is accomplished the switching-on of the drive device 105. As a further auxiliary device there is provided an output unit 407, for the output of the data obtained by means of the directional beam emitter 100, thus for instance condition reports regarding the monitored terrain or space, determination or reporting certain changes, coordinates and further information or data with respect to detected objects, alarm signals and so forth. Such data can preferably be delivered by coded signals which are suitable for use in known indicator devices and/or alarm devices.

Figure 7:
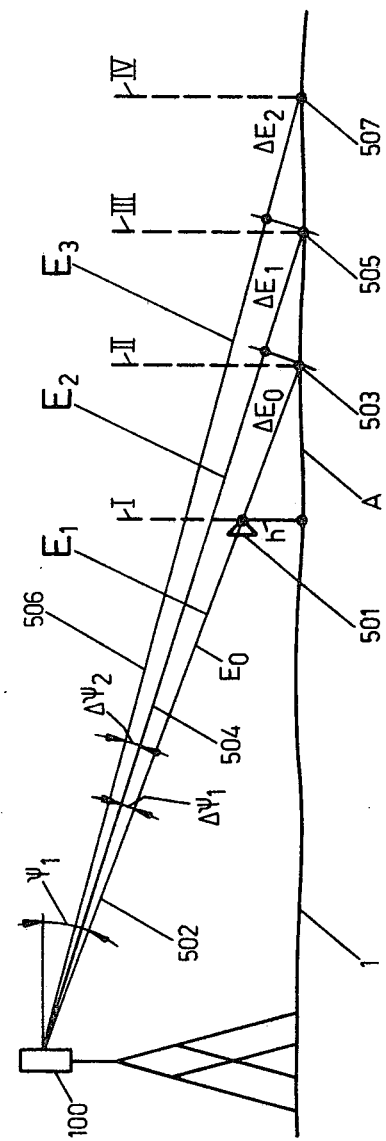
FIG. 7 is a schematic elevational view of a measuring beam course during the fixing or determination of certain virtual surfaces.
Figure 8:
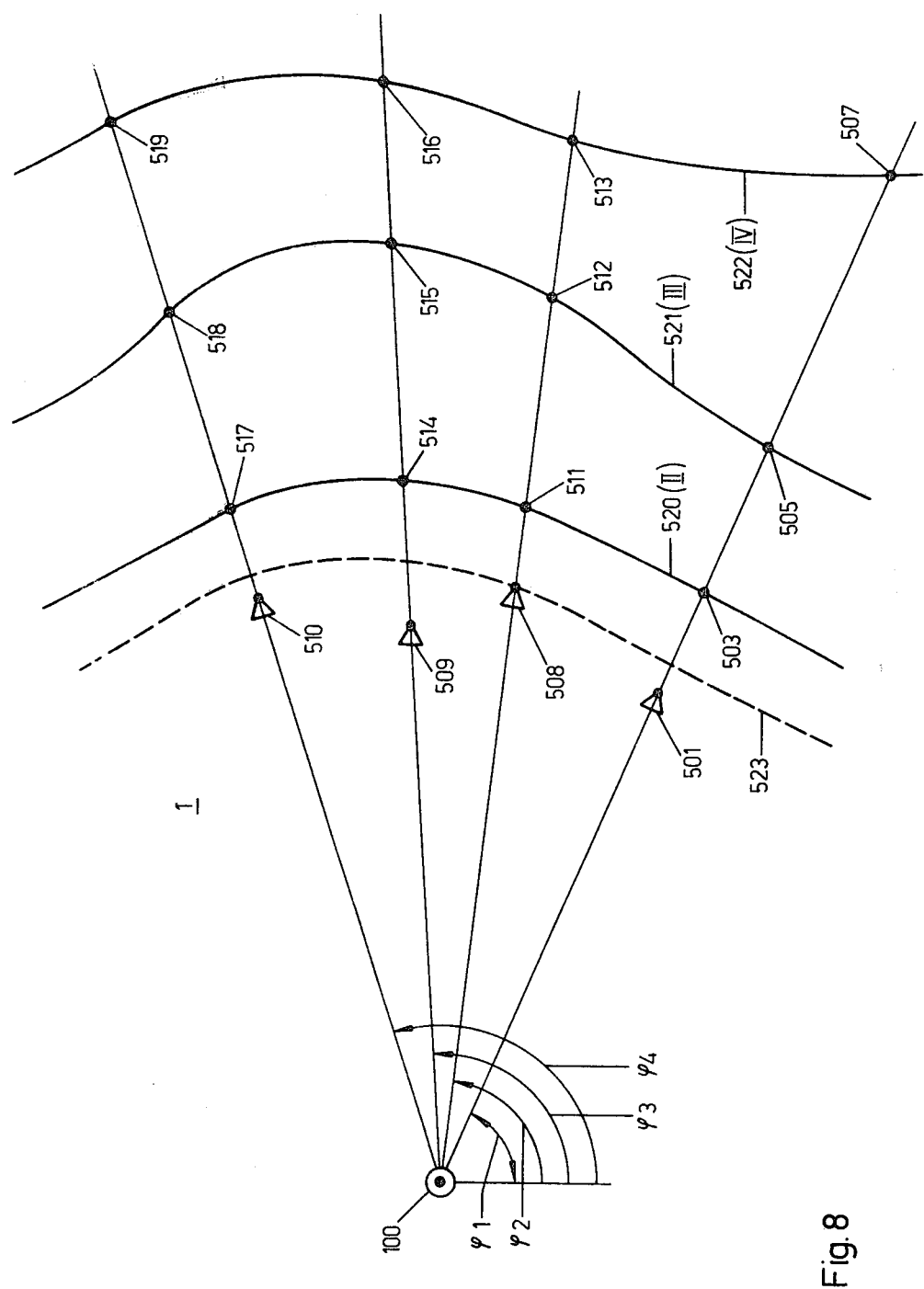
FIG. 8 is a schematic plan view showing the course of measuring beams during the fixing or determination of certain virtual surfaces.

At this point there will be considered the mode of operation of the described equipment based upon the illustration of FIGS. 5 and 6 and the further FIGS. 7 and 8 for a predetermined field of application.

FIG. 7 shows a schematic elevational view of the measuring beam course during the fixing of certain virtual surfaces. This elevational view illustrates the conditions in a vertical plane having the azimuth $\phi_1$ through the axis of the directional beam emitter 100, wherein for the initial input of coordinates of a first virtual surface I there is temporarily arranged a retro-reflector 501 at the height h. A measuring beam 502 impinges the retro-reflector 501 and has an elevation angle $\Psi_1$. The distance between the directional beam emitter 100 and the retro-reflector 501 in the first virtual surface I, in the direction of the measuring beam 502, amounts to $E_o$. If there is again removed the retro-reflector 501, then a measuring beam in the mentioned vertical plane and at the elevation angle $\Psi_1$ can impinge the terrain 1. This produces, until the impact point 503, a distance vector which is longer by the value $\Delta E_o$, wherein $E_o + \Delta E_o = E_1$.

A second virtual surface II is now fixed by the impact point 503. In the same vertical plane where there extended the measuring beam 502, it is now possible to transmit with an elevation angle difference $\Delta\Psi_1$ a further measuring beam 504. This further measuring beam 504 strikes the terrain 1 at the further impact point 505. By means of this further impact point 505 there is now also fixed the position of a third virtual surface III. As best seen by referring to FIG. 7, there is valid the relationship $E_2 = E_1 + \Delta E_1$. In analogous manner there is formed an impact point 507 at the terrain 1 by a higher traveling measuring beam 506 which travels at the greater elevation angle difference $\Delta\Psi_2$, and by means of which there is fixed a fourth virtual surface IV. Also in this case there is valid, in analogous manner, the distance vector $E_3 = E_2 + \Delta E_2$.

It is to be observed that due to the elevational angle difference $\Delta\Psi_1$ and $\Delta\Psi_2$ the distance difference $\Delta E_1$ and $\Delta E_2$ between the second and third as well as between the third and fourth virtual surfaces is fixed. Additionally, by virtue of the height h and the difference $\Delta E_o$ and the elevation angle $\Psi_1$ there is determined the horizontal spacing A of the second virtual surface II from the first virtual surface I or the retro-reflector 501.

In the case under consideration it has been assumed that the virtual surfaces I, II, III and IV extend vertically. If the virtual surfaces are selected to be spherical, with the directional beam emitter 100 as the center, then there are realized simplifications in the computations, since the distance vectors of all points of one such surface are equal.

FIG. 8 shows a schematic plan view of the course of measuring beams during the fixing of certain virtual surfaces. The measuring beams emitted at the azimuth angle $\phi_1$, $\phi_2$, $\phi_3$ and $\phi_4$ and in each case at the elevation angle $\Psi_1$, $\Psi_1 + \Delta\Psi_1$ and $\Psi_1 + \Delta\Psi_1 + \Delta\Psi_2$ by the directional beam emitter 100 impinge, on the one hand, the retro-reflectors 501, 508, 509 and 510 which are temporarily erected at the terrain 1, and, on the other hand, when they extend at the azimuth $\phi_1$ corresponding to the vertical plane, they impinge the impact points 503, 505 and 507 at the terrain 1. However, if the measuring beams travel in the vertical plane in accordance with the azimuth $\phi_2$, then, depending upon their elevation angle, they strike the impact points 511, 512 and 513. If the measuring beams extend in the vertical plane in accordance with the azimuth $\phi_3$, then, depending upon their elevation angle, they strike the terrain 1 at the impact points 514, 515 and 516. Finally, if the measuring beams extend in the vertical plane in accordance with the azimuth $\phi_4$, then, depending upon their respective elevation angle, they strike the impact points 517, 518 and 519.

The impact points 503, 511, 514 and 517 thus determine a virtual line 520 in the terrain 1, which constitutes the projection of the virtual surface II which, in this case, has been assumed to be vertical. In the same manner the impact points 505, 512, 515 and 518 determine a further virtual line 521 in the terrain 1, which constitutes the projection of the further virtual surface III which, in this case, has been likewise assumed to be vertical. Finally, the impact points 507, 513, 516 and 519 determine an additional virtual line 522 in the terrain 1, which constitutes the projection of the additional virtual surface IV, here again assumed to be vertical.

It therefore should be apparent that by virtue of the temporary arrangement of retro-reflectors it is possible to determine, in a simple manner, by means of the directional beam emitter 100 the coordinate values needed for the fixing of the virtual lines 503, 505, 507 (FIGS. 7 and 8) and for the fixing of the virtual surfaces I, II, III, IV (FIGS. 7 and 8). By appropriately programing the central computer 200, shown in FIG. 6, it is possible to store and evaluate the thus determined coordinate values.

However, it is also possible to freely fix or determine a first virtual line 523 in the terrain 1 as the starting basis for the determination or fixation of the virtual lines and virtual surfaces and starting from such virtual line 523 to fix further virtual lines in freely selected fixed spacings. The thus resultant coordinate values can then, for instance, be infed manually by means of the input unit 301 of the computer 300. Depending upon the topographical conditions of a field of application the first or the second mentioned method may be more advantageous for the determination of the virtual lines and surfaces.

Preferably, the line 523 also can be assumed to be aequidistant to a virtual line 520 which has been determined previously by means of retro-reflectors 501, 508, 509, 510 and the impact points 503, 511, 514, 517. This line 523 preferably can be be assumed to be at a spacing from the virtual line 520 which constitutes the minimum below the spacing of the retroreflectors 501, 508, 509, 510 to the related impact points 503, 511, 514, 517. This procedure simplifies the computation or mathematical operations to be performed by the computer 400.

The mode of operation of an apparatus according to the previously described exemplary embodiment is as follows:

By means of the input unit 406 the equipment is placed into operation. The input unit 406 assumes a number of functions and initiates different measures, and specifically:

1. Turning-on the current supply section 404 and the drive device 105.

2. Determination of the spacing between two virtual surfaces.

3. Plotting (once) the coordinates of a virtual surface.

4. Normal operation.

5. Turning-off the equipment.

1.1 During the turning-on of the current supply section 404 and the drive device 105 there is simultaneously placed in a defined starting state the central computer 200 and the satellite computer 300.

2.1 The determination of the spacing between both of the virtual surfaces can subsequently be accomplished manually according to rubric 1.1 above. Then in the first write-read storage (RAM) 205 of the central computer 200 there are introduced the constants, in order to distinguish between the virtual surfaces. Thus, for instance, three virtual surfaces are linked by two constant angles.

3.1. A further command, "plotting a virtual surface", infed to the input unit 406, activates the program which is stored for this purpose in the program storage (PROM) 204 of the central computer 200. The satellite computer 300 remains in its starting state. The equipment now accomplishes the following working steps:

3.1.1 Receiver 125 is set to the lowest sensitivity stage.

3.1.2 The entire space detected by the directional beam emitter 100 is scanned without any gaps by the measuring beams, that is to say, throughout the entire azimuth and elevation range.

3.1.3 The scanning lines pass with maximum focal spots.

3.1.4 Recording and storing characteristic values of selected sites which, by virtue of increased reflection capability, for instance, by using a retro-reflector which is temporarily located thereat, produce an increased intensity of the received light. Termination of the first recordal or plotting phase.

3.1.5 Mathematical linking by linear interpolation as aforedescribed of the values (coordinates) obtained under rubric 3.1.4 into a function $E(\phi,\Psi)$. This function is now specific to the equipment as concerns a defined task and the erection site of the directional beam emitter. The function $E(\phi,\Psi)$ is stored in the first write-read storage (PROM) 204 of the central computer 200 and remains unchanged throughout the entire time of employment of the equipment.

3.1.6 Transmission of the function values $E(\phi,\Psi)$ from the central computer 200 to the control and regulation device 130 together with the constant angle $\Delta\Psi$ for the spacing of the virtual surfaces (see the previous rubric 2.1) for controlling the beam deflection element 116. Additionally, a constant pulse frequency (pulse transmitter 112) is infed to the control and regulation device 130.

3.1.7 Start of the second recordal phase for generating the actual-values of the distances for the individually provided virtual surfaces. There are derived from the actual-values for the virtual surface II (FIG. 8), by subtraction of the value A (FIG. 7), the related reference values for the virtual surface I (FIGS. 7 and 8).

These values are stored in the first write-read storage (RAM) 205 of the central computer 200 and remain constant throughout the entire time of employment of the equipment.

The distance actual-value for the outer virtual surfaces III, IV (FIGS. 7 and 8) are calculated from the corresponding actual-values of the next inner virtual surfaces.

The resultant difference value ΔE together with the distance actual-values as the actual function is stored in the first write-read storage (RAM) 205 of the central computer 200 and constitute the reference values for a scanning cycle. The storage of all reference values in the first write-read storage 205 occurs in a timewise order.

3.1.8 Clearing of the existing characteristic values which have been carried out in accordance with rubric 3.1.4. above.

4.1. After the equipment has processed the reference values in the afore-described manner, it is then capable of assuming and performing the normal operation for the monitoring or supervision with the program in the program storage 204 of the central computer 200 and the program in the program storage 303 of the satellite computer 300. This normally occurs by means of a control command which is delivered by the input unit 406 to the central computer 200 and the satellite computer 300.

The program stored in the program storage (PROM) 204 is developed for the specific field of use of the equipment. In the case of the central computer 200 it contains, apart from the method steps for recording the virtual surfaces, the steps for storage of the infed distance measuring values, their comparison with stored reference values for obtaining differences which are to be stored and for the output of stored reference values for defined angular values in the sense of the double-headed arrow 118 of the beam deflection element 116 (FIG. 5) and for input to the regulation and control device 130 (FIG. 6).

In the assumed examplary embodiment the switching from the previously mentioned measure (step) 3 to the measure (step) 4 occurs automatically after fulfilling the measures (steps) 1 to 3 and determining the mode of operation (vertical or horizontal orientation of the rotational axis of the directional beam emitter 100), something requiring different programes for processing of measured values.

Due to the coaction of the computer 400 with the directional beam emitter and owing to the controlled rotational movement of the directional beam emitter 100 and the controlled pivoted movement of the beam deflection element 116 the equipment performs the function $E(\phi,\Psi)$, and specifically, a number of times, depending upon the number of virtual surfaces.

Since the directional beam emitter 100 only rotates with approximately constant angular velocity, but the angular scanning must be accomplished with maximum accuracy, the outfeed of the radiation pulses of the pulse transmitter 112 (FIGS. 5 and 6) must be controlled with the aid of the instaneous values of the rotational transmitter 107, by means of the regulation and control device 130, in such a manner that the pulse frequency, while no longer a constant frequency, however delivers the individual pulses in all instances in the angular position correlated therewith. The corrections needed for this purpose are undertaken by the regulation and control device 130 based upon the data $\phi,\Psi$ or $E(\phi,\Psi)$ stored in the write-read storages 205 and 206 of the central computer 200.

From each received pulse obtained by reflection there is formed a distance actual-value and stored on-line in the write-read storage 205 (FIG. 6), that is to say in-step. Thereafter, the distance reference-value which has been stored in the write-read storage 205, possessing the same azimuth $\phi$, but corresponding to an inner virtual surface, i.e. the elevation $\Psi_o$, is subtracted from the distance actual-value. The resultant actual-difference $\Delta E = f(\phi,\Psi)$ is now compared with the reference-difference stored in the write-read storage 205. For the case that the reference-actual value difference is not equal to null, then the actual-value difference is stored as the new reference-value difference in the write-read storage 205 and furthermore also in the write-read storage 206.

The reference-value distances in the write-read storage 205 for the virtual surfaces—with the exception of those with the virtual surfaces I (FIG. 7)—are likewise replaced by the actual-value distances, and thus form the reference values for the next scanning cycle.

Normally, with unchanged periphery the reference-actual value difference is equal or substantially equal to to null, that is to say, there are not stored any new values.

As soon as an object enters the periphery or the virtual surface, then this difference becomes greater than null, and thus, is stored in the described manner in the write-read storages 205 and 206.

The satellite computer 300 (FIG. 6) avails itself by means of the collecting bus-control unit 401, via the transmitter/receiver 402, of the timewise and locally coded differences $\Delta E = f(\phi,\Psi)$, under circumstances also the function $E(\phi,\Psi)$ from the write-read storage 206 of the central computer 200 and stores such in the write-read storage 304.

Of course the central computer 200 possèsses priority, so that the satellite computer 300 can only then interrogate data when the central computer 200 pauses.

In the program storage 303 of the satellite computer 300 there are contained the criteria for elimination of false alarms by inconsequential influences, as well as for self-checking of the equipment. Under the term "inconsequential influences" there are to be understood those brought about, for instance, by birds, leaves, snow, small moving animals, balls and light. On the other hand, appreciable influences or factors are for instance, intruders.

The satellite computer 300 possesses, by means of its own input/output unit 301, a connection to the output unit 407 and to the real time clock 403. It assumes the task of checking the electrical-mechanical state of the equipment by means of the corresponding control lines. The differences which are processed in accordance with local and timewise correlations, depending upon the comparison criteria, trigger a pre-alarm or alarm from the program storage (PROM) 303, which is then further transmitted by the satellite computer 300 to the output unit 407.

All of the differences which have been stored by the satellite computer 300 in its write-read storage (RAM) 304, after expiration of a certain amount of time derived from the real time clock 403, are cleared after the input of the last difference considered with respect of time. This operation repeats periodically after expiration of such period of time.

Due to the selected manner of data processing in the central computer 200 together with the last-mentioned measures in the satellite computer 300 it is possible that, for instance, with an arrangement of the directional beam emitter 100 upon a building and monitoring of the surroundings, the equipment reacts equally, by not sounding an alarm, to buildings which are erected at the working region of the directional beam emitter, as well as to a growing blanket of snow. The latter will be detected in that the distance between the outer virtual surfaces remains constant, but the difference between the virtual surfaces I and II (FIGS. 7 and 8) varies. In the presence of fog the differences of the outer virtual surfaces alter proportionally as a function of time or in succession, those of the innermost virtual surfaces last. Bids and loose leaves, which have not tripped any alarm, are eliminated in that the (last) difference between the last and the next to last virtual surface ≦0, and the next to last difference remains unchanged. Since the satellite computer 300 always immediately interrogates the differences from the write-read storage 206 and thus clears; this write-read storage 206 can be designed as a small storage unit or memory.

Apart from the storage of distance measuring values and the comparison with reference values resulting from the differences, which are likewise stored, the central computer 200 also has assigned to it the task of making available to the regulation and control device 130 the value which follows the occurring distance measured value in respect to angular data, related to its resolution time, for the rotational transmitter 107 and the beam deflection element 116. The regulation and control device 130 determines, by means of the values from the rotational transmitter 107, in the regulation loop, the time during which the beam deflection until 116 must assume the position indicated by the central computer 200, at which also the rotational transmitter and thus the rotatable upper portion 103 (FIG. 5) assumes that position where the beam pulse is produced for obtaining the next distance measured value. The exact time and spatial (direction) correlation of the beam pulse is mandatory for the reproduction of the distance measured value which is formed at the periphery. This occurs in order to avoid undefined differences.

If there are used as the beam pulses optical, for instance infrared radiation pulses, then the pulse transmitter 112 (FIG. 6) can have operatively associated therewith a vario-optical system or variably focus lens 132 (FIG. 6) and the focal width thereof can be controlled by the regulation and control device 130 as a function of the distance measured values.

5. Turning-off the apparatus. Two case are distinguished namely:

5.1. Turning-off the apparatus within the time of employment thereof. In this case the current supply for the computer 400 is maintained, only the peripheral units containing measuring and regulation portion are disconnected from the current supply.

5.2. Turning-off the apparatus in general. All units are disconnected from the current supply, i.e., placed in a voltageless condition.

Figures 9, 9A:
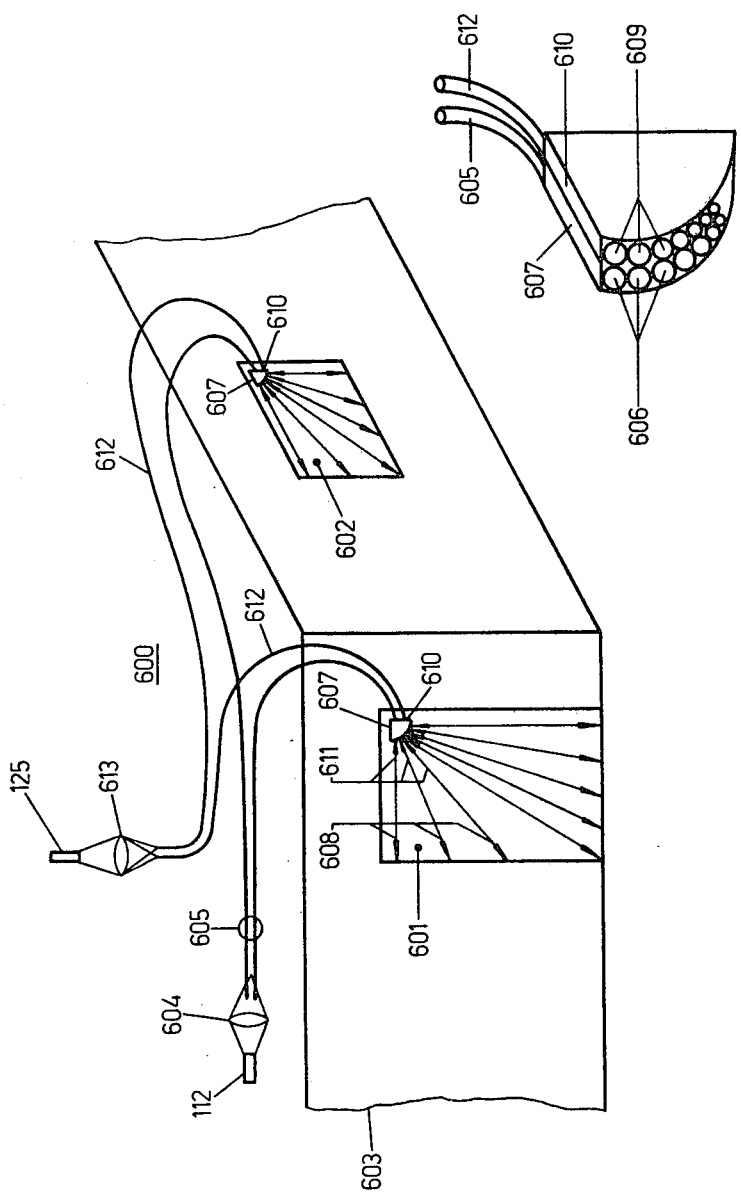
FIG. 9 shows an arrangement for region or space monitoring employing a beam splitting system.
FIG. 9a illustrates a detail of the arrangement of FIG. 9.

A further exemplary embodiment now will be explained based upon FIGS. 9, 10, 11 and 12. FIG. 9 illustrates an arrangement containing a beam splitting or dividing system.

In FIG. 9 reference character 600 designates the beam dividing or splitting system in its entirety, which is provided when using the invention for monitoring discrete surfaces, for instance a door opening 601 and a window opening 602 of a building 603.

The beam splitting system or beam splitter 600 is connected, on the one hand, with a pulse transmitter 112 and, on the other hand, with a receiver 125. By means of a transmitter coupling element 604, for instance a first lens arrangement for coupling a laser diode of the pulse transmitter 112 with glass fibres of a transmission conducting system 605, composed of one or a number of glass fibre bundles, preferably of different length, the transmission energy is infed by means of the individual fibres of each glass fibre bundle to a respective transmitting lens 606 of a beam splitter 607 and from such lenses is propogated in the form of transmission beams 608 in different directions in a surface extending parallel to the door plane. The thus formed transmission or transmitted beams 608 are directed towards the outline or circumference of the door and, then when the door opening is free, reflected therefrom. Receiving lenses 609 of the beam collector 610 remove the more or less diffuse reflections of the received beams 611 correlated with certain transmitted beams, these received beams 611 traveling opposite to the transmitted beams 608. The receiving lenses 609 conduct the received energy, by means of the individual fibres of a glass fibre bundle of a receiving conducting or transmission system 612, by means of a further lens system of a receiver coupling element 613, to the receiver 125.

FIG. 9a illustrates in detail the preferably structurally assembled together beam splitter 607 and beam collector 610. The lenses 606 and 609 preferably can be structurally combined in conventional fashion with the relevant ends of the related glass fibres.

The beam splitter system 600 extends from the pulse transmitter 612 to the monitored surfaces or spaces 601, 602 and possibly further surfaces and then again back to the receiver 125. Preferably, the glass fibre bundle belonging to the transmission conductive system 605 and the glass fibre bundle belonging to the receiver conductive system 612, with optical decoupling, are laid in a common channel, for instance a tube so as to be protected against damage, for instance inside the building or structure constituting the monitored region or space 1.

In order to obtain directional-dependent information concerning objects penetrating the monitored spaces or surfaces, it is possible to carry out monitoring in spatially tandemly arranged surfaces, in order to obtain timewise differences of penetration of the surfaces. Preferably, then, the momentarily related beam splitter 607 and beam collector 610 are arranged in neighboring corners of the surfaces or spaces 601 and 602 to be monitored.

The previously described further exemplary embodiment affords an appreciably simplified system design owing to the omission of moved components, in particular the structure of the computer is appreciably simplified in relation to that of the embodiment of FIG. 6.

Figure 10:
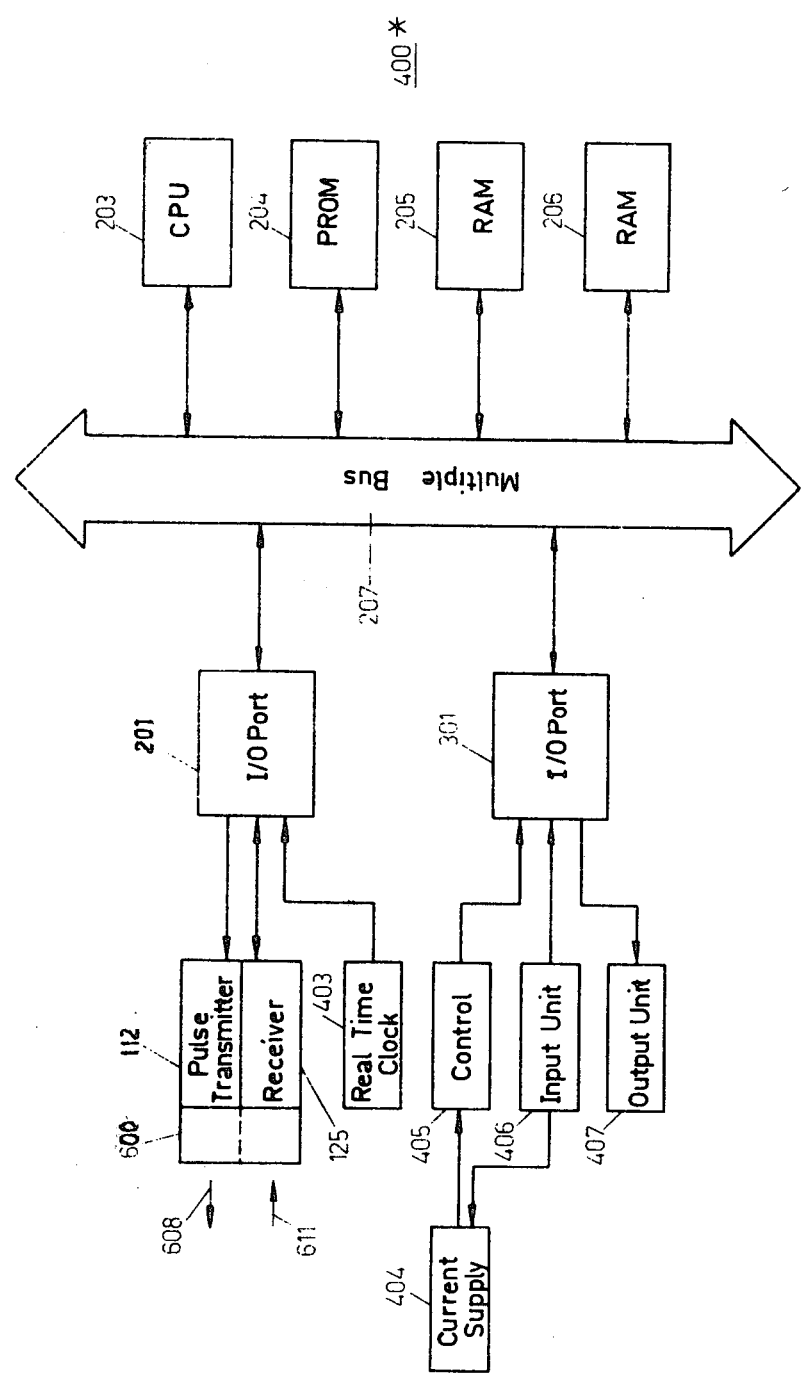
FIG. 10 is a block circuit diagram of an exemplary embodiment containing a beam splitting system.

FIG. 10 shows a block circuit diagram of the described exemplary embodiment containing a beam splitter system 600. The plus transmitter 112 transmits transmitter beams 608 by means of the generally illustrated beam splitter system 600. The received beams 611 are infed from the beam splitter system 600 to the receiver 125. In a manner analogous to the illustration of FIG. 6. a computer 400* is provided for controlling the pulse transmitter 112 and for evaluating the output signals of the receiver 125.

From the transit or travel times of the transmitted pulses from the output of the transmitter 112 until the reception of the signals related to the received beams it is possible to again form distance vectors. It is to be observed, however, that both the transit times in the beam splitter system 600 and also the transit times in the free space of the monitored surfaces are incorporated into the distance vectors E of such embodiment, that is to say, mathematically processed.

The individual blocks of FIG. 10 correspond, in analogous manner, to the blocks designated with the same reference characters in the arrangement of FIG. 6.

With the present further exemplary embodiment the irradiated or reflecting parts of the door frame or window frame, in the manner heretofore defined, form a respective virtual line or surface, by means of which there is limited by the radiation the surface (door opening) defined by the beam direction of the beam splitter 607. Monitoring therefore is limited to the surface section located within such framed portion and serving as the actual protected surface or protected space.

If, as mentioned, there are computed the transit or travel times, and thus, the received vectors, for instance at the transmitter output, then there will be recognized from the showing of FIG. 9 that each monitored surface or space, i.e. spaces 601 and 602 and possibly further spaces or surfaces can be correlated to a quite specific region, which, in each instance, results from the sum of the transit time between the pulse transmitter 112 to the beam splitter 607 plus the travel time of the transmitted beams. The shortest transmitted beam at the opening 601 is realized when a disturbing or intruding object is located directly at the beam splitter 607. The related transit time is then the shortest value which can be determined in conjunction with the opening 601, and thus, there is here realized the shortest distance vector. The longest travel time and therefore the largest distance vector produces at the opening 601 a diagonally extending transmitted beam 608 or received beam 611, respectively.

Due to the periodic measuring of each opening 601, 602 and possibly further openings or monitored spaces, it is therefore possible to continuously form and store defined received vectors. Upon intrusion of an object at any one of the monitored surfaces (openings) there is altered at least one distance vector in relation to the temporarily stored distance vector which was heretofore formed for the relevant surface (opening) and direction or directions. Such change accordingly can be correlated to a certain surface (opening) due to the correlatability to the range of distance vectors (transit times) correlated to the relevant surface (opening).

Consequently, there is not only afforded the possibility of sounding an alarm when an intruder unlawfully enters, as concerns the point in time thereof, but at the same time there can be carried out an indication as to the location of the intrusion, namely the surface, opening 601, 602 and so forth.

Figure 11:
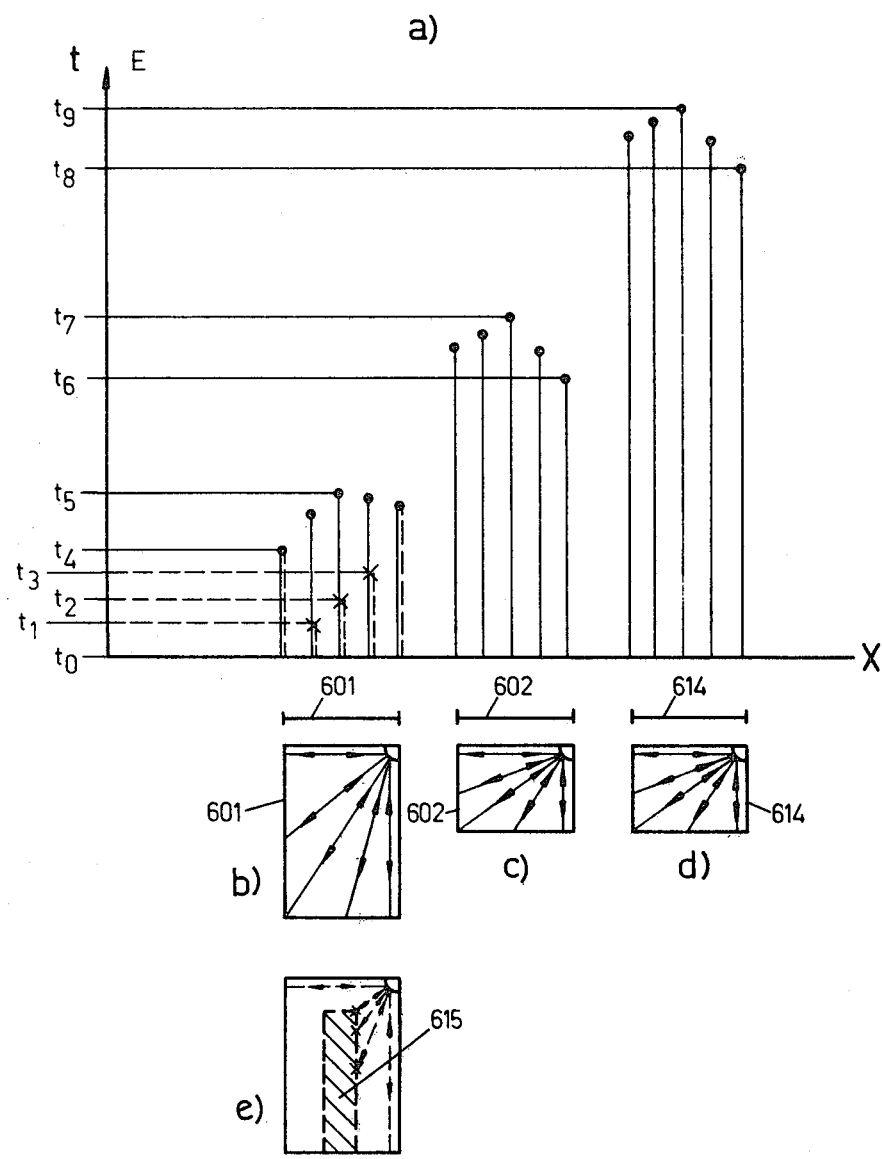
FIG. 11 schematically illustrates the serial evaluation of distance vectors.
Figure 12:
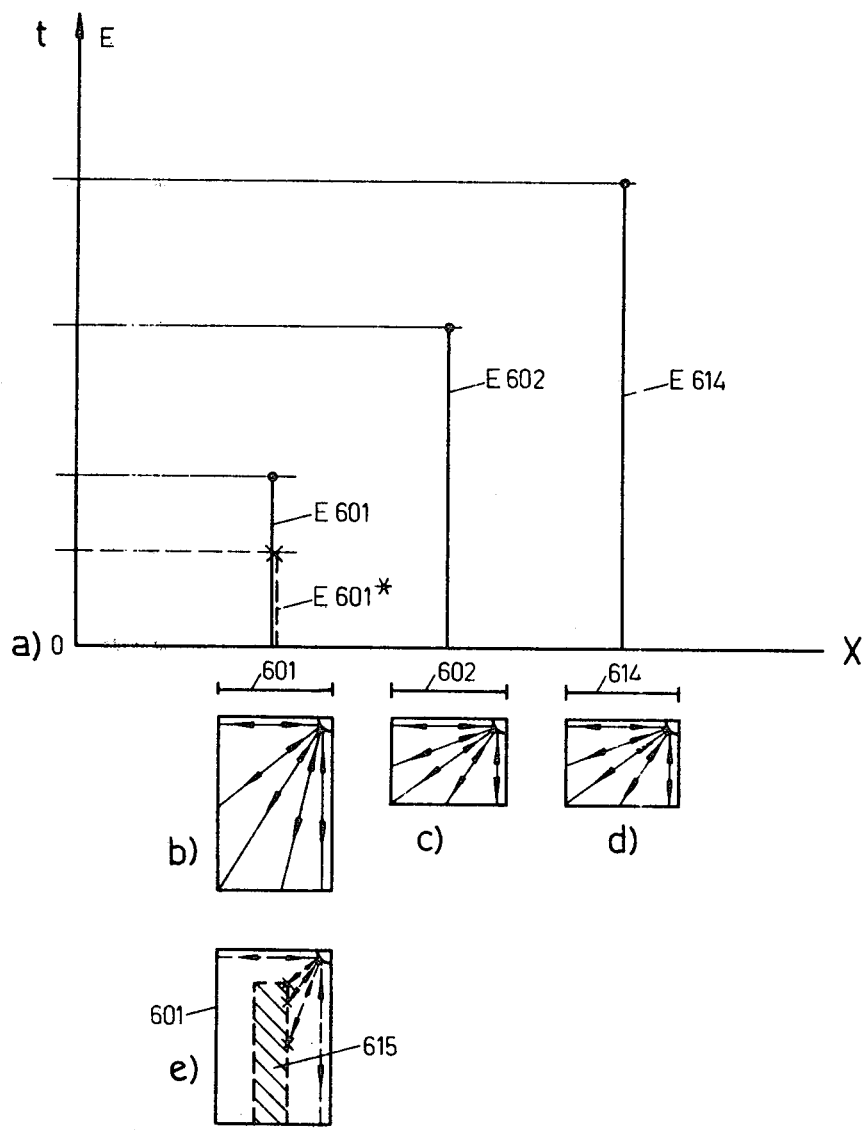
FIG. 12 schematically shows the groupwise evaluation of distance vectors.

FIG. 11 schematically shows the serial evaluation of the distance vectors E obtained with an arrangement according to FIGS. 9 and 10. The distance vectors E, as mentioned, correspond to the related transit times, wherefore in the showing a of FIG. 11 there has been plotted along the ordinate both the time t and also the distance E.

The abscissa axis X designates the monitoring site and is structured such that it corresponds to a point in time $t_o$, for instance the time that the transmitted beam moves out of the beam splitter 607 located closest to the transmitter 112.

The illustration of FIG. 11a designates three groups of distance vectors each containing five distance vectors, wherein the first group is correlated with opening 601, the second with opening 602 and the third with a further opening 614.

The full line distance vectors bounded by a point represent the normal or standard state, i.e. no intrusion of an object in the opening.

The broken line designated distance vectors, bounded or terminated by a cross, designate the case where an object 615 has intruded.

These conditions have been shown in the illustrations of FIGS. 11b, 11c, 11d, 11e.

There will be easily recognized from FIG. 11 that the transit time range $t_4$ to $t_5$ is to be correlated in the undisturbed case to the opening 601, the transit time range $t_6$ to $t_7$ in the undisturbed case to the opening 602 and the transit time range $t_8$ to $t_9$ to the opening 614.

If an intruding object 615 occurs, for instance, at the opening 601, then there occurs a premature reflection at the object 615 at the border of the opening 601. This leads to shortened transit or travel times $t_1$, $t_2$ and $t_3$ and to shortened distance vectors; the latter have been shown in broken lines in FIG. 11a and terminate with a cross.

By comparison of the shortened distance vectors with the normal distance vectors (full lines) correlated with the same opening 601, there is realized the point in time and the located or the opening 601 where an intrusion has occurred.

These are mathematical or arithmetic operations which automatically occur by appropriate programing of the computer 400* (FIG. 10). There are thus processed in series all of the individual distance vectors.

In a simplified case it is possible to determine the intrusion of an object also with groupwise processing of the distance vectors. This will be explained based upon the showing of FIG. 12. If there is employed an electro-optical distance measuring device of known construction, such as for instance disclosed in the German Patent Publication No. 2,634,627, as the receiver 125, then with suitable dimensioning of the system an input oscillation circuit is commonly driven in each case by a group of received signals correlated in their entirety to an opening 601, 602 or 614, thereby realizing a groupwise evaluation of the distance vectors. Hence, there is provided only one received vector per group or opening. While referring to the conditions according to FIG. 11 there will be recognized for the undisturbed case a respective common distance vector E 601, E 602, E 614, shown in FIG. 12 by full lines terminating at a point.

If an object 615 appears at the opening 601 then there is shortened the related distance vector, as indicated in FIG. 12a by the broken line designated by E 601* and terminating with a cross. The occurrence of such shortened distance vector constitutes a sign for the penetration of object 615 into the opening 601 or other monitored space.

While there are shown and described present preferred embodiments of the invention, it is to be distinctly understood that the invention is not limited thereto, but may be otherwise variously embodied and practiced within the scope of the following claims.

Accordingly, what I claim is:

1. A method of monitoring a region by means of pulsed directional radiation, comprising the steps of:
fixing certain points in space to define at least one virtual line or virtual surface;
dividing a surface into partial surfaces by means of said virtual line or a space into partial spaces by means of said virtual surface;
assigning a respective predetermined significance to each said partial surface or partial space;

utilizing measuring beams possessing a substantially punctiform expanse at the virtual line or virtual surface or at an object to be detected;

transmitting the measuring beams in defined directions; and determining by means of the transmitted measuring beams at least one parameter for the identification of at least one object.

2. The method as defined in claim 1, further including the steps of:

altering as a function of time coordinates of said at least one virtual line or virtual surface in relation to a fixed absolute reference point.

3. The method as defined in claim 1, further including the steps of:

altering as a function of time coordinates of said at least one virtual line or virtual surface in relation to a movable relative reference point.

4. The method as defined in claim 1, further including the steps of:

storing the coordinates of at least part of said certain points which are fixed in space.

5. The method as defined in claim 4, further including the steps of:

determining for at least one of said certain points, which itself is not defined by stored coordinates, its related coordinates based upon a functional correlation.

6. The method as defined in claim 1, further including the steps of:

deriving from the transmitted measuring beams information concerning the distance to the object to be identified; and processing such distance information to determine movement criteria of the object.

7. The method as defined in claim 1, further including the steps of:

monitoring the transmitted measuring beams;

determining the absence of reflected energy at least at one of the transmitted measuring beams;

obtaining upon determination of the absence of reflected energy at least at one of the transmitted measuring beams stored distance vectors providing information concerning the distance to the object to be identified; and processing such information to determine movement criteria of the object.

8. The method as defined in claim 1, further including the steps of:

deriving from the transmitted measuring beams information concerning the distance to the object to be identified; and processing such distance information to selectively determine at least any one of the size, configuration, or both, of the object.

9. The method as defined in claim 1, further including the steps of:

monitoring the transmitted measuring beams;

determining the absence of reflected energy at least at one of the transmitted measuring beams;

obtaining from such determination of the absence of reflected energy at least at one of the transmitted measuring beams stored distance vectors containing information concerning the distance to the object to be identified; and processing such information to selectively determine at least any one of the size, configuration, or both of the object.

10. The method as defined in claim 1, further including the steps of:

measuring the intensity of reflected energy of the transmitted measuring beams; and utilizing the measured intensity of the reflected energy of the transmitted measuring beams as a criterion for the recognition of a predetermined object.

11. The method as defined in claim 1, further including the steps of:

deriving various information from the transmitted measuring beams concerning the object to be identified; and processing the obtained information in predetermined logical combinations in order to derive criteria for the recognition of a predetermined object.

12. The method as defined in claim 11, further including the steps of:

comparing the derived criteria with stored information to obtain still further criteria for the recognition of a predetermined object.

13. The method as defined in claim 12, further including the steps of:

utilizing as the stored information data which selectively characterizes at least any one of the movement behavior, size, configuration and nature of the object to be identified.

14. The method as defined in claim 1, further including the steps of:

comparing said at least one determined parameter with stored data;

evaluating the comparison operation to obtain criteria with respect to at least any one of the residence time, penetration, or both, of the object into one of said partial surfaces or one of said partial spaces; and signalling the presence of the identified object.

15. The method as defined in claim 1, further including steps of:

deriving from said at least one determined parameter for said identification of at least one object magnitudes derived from distance vectors concerning the distance to the object to be identified;

comparing and processing the derived magnitudes with reference values while determining the timewise sequence of occurrence of measured values derived from the transmitted measuring beams in order to determine and identify the object which has penetrated into a given part of the monitored region.

16. The method as defined in claim 15, wherein:

said given part of said monitored region defines a warning zone into which the object to be identified has penetrated.

17. The method as defined in claim 15, wherein:

said given part of said monitored region defines a protective zone into which there has penetrated the object to be identified.

18. The method as defined in claim 15, further including the steps of:

triggering an alarm upon identification of the object which has penetrated into the monitored region.

19. The method as defined in claim 15, further including the steps of:

automatically triggering defensive measures upon determination of penetration of at least one predetermined object into the monitored region.

20. The method as defined in claim 19, further including the steps of:

triggering the defensive measures selectively in consideration of at least any one of the site, the movement, or both, of the object which has pentrated into the monitored region.

21. The method as defined in claim 1, further including the steps of:
transmitting the measuring beams as directional radiation in different directions.

22. The method as defined in claim 21, wherein:
said steps of transmitting the measuring beams as directional radiation in different directions encompasses utilizing a movable transmitter.

23. The method as defined in claim 21, wherein:
said step of transmitting the measuring beams as directional radiation in different directions encompasses utilizing movable beam deflection elements operatively associated with a transmitter.

24. The method as defined in claim 1, further including the steps of:
transmitting the measuring beams in the form of directional radiation in different directions by means of a plurality of transmitters which transmit the measuring beams in different directions.

25. The method as defined in claim 1, further including the steps of:
transmitting the measuring beams in the form of directional radiation in different directions by utilizing at least one transmittter with which there is operatively associated a beam splitter for splitting the transmitted directional radiation.

26. The method as defined in claim 1, further including the steps of:
transmitting the measuring beams in the form of individual radiation pulses in different directions in accordance with a predetermined program;
receiving spatially selective in succession signals reflected at the related radiation direction; and
individually evaluating the reflected signals.

27. The method as defined in claim 26, wherein:
the pulses are transmitted in a transmitter channel and the reflected signals are received in a receiver channel; and
utilizing as the transmitter channel and the receiver channel channels which are mutually decoupled with respect to one another.

28. The method as defined in claim 1, further including the steps of:
transmitting the measuring beams in the form of radiation pulses transmitted in groups simultaneously in different directions and in accordance with a predetermined program;
receiving in groups reflected energy of the transmitted radiation pulses; and
evaluating in groups the received reflected energy.

29. The method as defined in claim 28, further including the steps of:
detecting a change in the received signal of the reflected energy due to penetration of an object into the region of transmission of the radiation; and
utilizing the detected change of the received signal as criteria for tripping an alarm.

30. The method as defined in claim 29, further including the steps of:
utilizing a beam splitter for splitting the transmitted measuring beams.

31. The method as defined in claim 29, further including the steps of:
utilizing at least two beam splitters for the splitting of the radiation of the transmitted measuring beams into different surfaces;
evaluating the timewise difference of the change of an output signal in said at least two beam splitters in order to determine the direction of movement of an object which has penetrated into the region to be monitored; and
employing such determined change as criteria for the directional-dependent tripping of an alarm.

32. The method as defined in claim 1, further including the steps of:
transmitting the measuring beams by electromagnetic energy which is transmitted in the form of pulses.

33. The method as defined in claim 32, further including the steps of:
utilizing pulse-like laser radiation to obtain the transmitted measuring beams.

34. The method as defined in claim 33, further including the steps of:
transmitting pulses in the range of invisible light to form the transmitted measuring beams.

35. The method as defined in claim 1, further including the steps of:
focusing the radiation of the transmitted measuring beams as a function of the direction of transmission of such radiation.

36. The method as defined in claim 1, further including the steps of:
determining said at least one parameter by measuring reflected energy of the transmitted measuring beams; and
selectively controlling at least any one of the transmission output of the transmitted radiation or receiving sensitivity of the reflected radiation as a function of the direction of the radiation.

37. The method as defined in claim 1, further including the steps of:
determining said at least one parameter by measuring the reflected energy of the transmitted measuring beams; and
selectively controlling at least any one of the transmission output or receiving sensitivity as a function of a predetermined magnitude.

38. The method as defined in claim 37, wherein:
said predetermined magnitude constitutes the magnitude of distance vectors derived from the transmitted measuring beams and the reflected energy or absence of reflected energy.

39. The method as defined in claim 37, wherein:
said predetermined magnitude constitutes the intensity of the reflections of the transmitted measuring beams.

40. The method as defined in claim 1, further including the steps of:
deriving said at least one determined parameter from the reflection capability of the object with respect to the radiation of the transmitted measuring beams.

41. The method as defined in claim 40, further including the steps of:
processing such obtained reflection capability in order to detect the object.

42. The method as defined in claim 41, wherein:
said processing steps entails determining the reflection capability of the object in relation to at least selectively any one of other objects or the background.

43. The method as defined in claim 40, further including the steps of:
separately detecting objects having greater reflection capability from the totality of all objects or the background by intentionally reducing the transmission output of the transmitted radiation or the received sensitivity of the received radiation reflection by the object.

44. The method as defined in claim 1, wherein:
said step of fixing certain points in space to define at least one virtual line or virtual surface comprises the steps of:
temporarily erecting reflectors which reflect the transmitted measuring beams in the form of reflected radiation energy;
determining the reflected radiation energy which is temporarily reflected by the erected reflectors during a certain time span;
deriving from the reflected radiation energy distance vectors correlated to related ones of said certain points;
temporarily evaluating only such received distance vectors; and
storing such distance vectors and the related coordinates of said certain points.

45. The method as defined in claim 1, further including the steps of:
correlating said at least one virtual line or virtual surface to a travel path for objects in the form of vehicles;
detecting the crossing of the virtual line or penetration of the virtual surface by at least one vehicle; and
evaluating and recording such detection step.

46. The method as defined in claim 1, further including the steps of:
monitoring a surface or a space with respect to a condition to determine possible changes thereof; and
evaluating changes of the determined condition.

47. The method as defined in claim 46, wherein:
said condition is a constant condition.

48. The method as defined in claim 46, wherein:
said condition is a changing condition.

49. The method as defined in claim 46, further including the steps of:
fixing said at least one virtual line or virtual surface so as to lie upon the surface of an object which is to be monitored.

50. A method of preparing a region for monitoring thereof by means of pulsed direction radiation, comprising the steps of:
transmitting energy in predetermined directions and in a predetermined sequence;
intentionally interrupting the path of transmission of the energy so as to reflect at least part of said transmitted energy at predetermined points; and
fixing said predetermined points in space to define at least one virtual line or virtual surface.

51. A method of monitoring a region by means of pulsed directional radiation, comprising the steps of:
transmitting radiation in a predetermined sequence and in predetermined directions into the region to be monitored;
reflecting at certain points in the region to be monitored the transmitted radiation;
processing the received reflected radiation to fix said points in space in order to define at least one virtual line or virtual surface;
dividing the region to be monitored into partial regions by means of said virtual line or virtual surface; and
supervising the partial surfaces or partial spaces in order to detect intrusion or changes thereat.

52. A method of preparing a region to be monitored for determination of a desired condition thereof, comprising the steps of:
transmitting beams at defined intervals and in predetermined directions at the region to be monitored;
intentionally intercepting at least given ones of said transmitted beams at predetermined points to reflect radiation energy of said transmitted beams; and
processing the reflected radiation energy to plot at least one virtual line or virtual surface in order to produce an imaginary light fence for monitoring said region.

53. The method as defined in claim 52, further including the steps of:
storing data regarding the plotted imaginary light fence;
transmitting measuring beams at defined intervals and in predetermined directions in the direction of the light fence and to the region to be monitored;
comparing reflected energy or absence of reflected energy of said transmitted measuring beams at least with said stored data regarding the plotted imaginary light fence to determine whether or not energy of said transmitted beams is reflected to obtain data indicative of the condition of the region to be monitored; and
processing said obtained data and stored data to determine the condition of the region to be monitored.

54. The method as defined in claim 53, wherein:
said condition to be monitored is whether there has occurred an unauthorized intrusion at the region to be monitored.

55. The method as defined in claim 53, wherein:
said condition to be monitored is whether there is any change in the physical characteristics of the region to be monitored.

56. The method as defined in claim 53, wherein:
said condition to be monitored is the appearance of at least oe object at the region to be monitored.

57. An apparatus for monitoring a region by pulsed directional radiation, comprising:
a directional radiation emitter;
said directional radiation emitter being provided with a pulse transmitter for emitting pulsed directional radiation in a defined timewise sequence and in defined directions;
said directional radiation emitter including a receiver for the spatially directed reception of reflected energy of the directional radiation transmitted by the pulse transmitter; and
computer means serving as an evaluation device for the arithmetic evaluation of a multiplicity of reflection signals derived from the reflected radiation energy and which have been received from different directions or the absence of reflection signals.

58. The apparatus as defined in claim 57, wherein:
said computer means is operative for the timewise change of coordinate values stored therein of at least one virtual line or virtual surface; and
said directional radiation emitter having a fixed erection site.

59. The apparatus as defined in claim 57, wherein:
said computer means is operative for the timewise change of coordinate values stored therein relating to at least one virtual line or virtual surface; and
said directional radiation emitter has a movable erection site.

60. The apparatus as defined in claim 57, wherein:
said evaluation device comprises storage means for the reception of information for the recognition of predetermined objects.

61. The apparatus as defined in claim 57, further including:

output means operatively associated with said evaluation device and serving for the indication of an alarm.

62. The apparatus as defined in claim 57, wherein:
said directional radiation emitter comprises a beam deflection element;
said directional beam emitter further comprises an upper portion containing said pulse transmitter, said receiver and said beam deflection element;
said directional beam emitter still further comprising a lower portion secured at an erection site; and
means rotatably mounting said upper portion about an axis with respect to said lower portion.

63. The apparatus as defined in claim 62, further including:
a regulation and control device operatively associated with at least any one of said pulse transmitter and said beam deflection element;
said directional radiation emitter further including a rotational transmitter;
said regulation and control device being operatively associated with said rotational transmitter; and
said regulation and control device controlling the point in time of outfeed of radiation pulses of the pulse transmitter while taking into account and correcting angular errors of at least any one of the rotational movement of the upper portion and the angular errors of the beam deflection element.

64. The apparatus as defined in claim 62, wherein:
said directional radiation emitter includes means arranged after the pulse transmitter for feeding radiation of the pulse transmitter to said beam deflection element.

65. The apparatus as defined in claim 64, wherein:
said beam deflection element is structured to define a controllable beam deflection element.

66. The apparatus as defined in claim 64, wherein:
said feeding means comprises a parabolic mirror.

67. The apparatus as defined in claim 64, wherein:
said feeding means comprises a controllable vario-optic means.

68. The apparatus as defined in claim 64, wherein:
said beam deflection element comprises an oscillating mirror which is reflectively coated at both of its faces;
a pivot device cooperating with said oscillating mirror;
a regulation and control device for controlling said pivot device in order to pivot the oscillating mirror through essentially exactly defined angular values; and
one face of the oscillating mirror being impinged with the transmitted radiation and the other face with the received reflection radiation.

69. The apparatus as defined in claim 68, wherein:
said oscillating mirror has an essentially elliptical configuration.

70. The apparatus as defined in claim 66, wherein:
said directional radiation emitter includes: a deflection mirror arranged after the beam deflection element;
said deflection mirror outwardly directing the transmitted radiation as a function of the momentary position of the beam deflection element through a varying elevation angle;
a second deflection mirror arranged forwardly of the beam deflection element;
a further parabolic mirror; and
said second deflection element delivering reflected transmitted radiation energy from the outside by means of the beam deflection element and said further parabolic mirror to the receiver from a direction which is opposite the direction of the transmitted radiation beam departing from the directional radiation emitter.

71. The apparatus as defined in claim 70, wherein:
said directional radiation emitter includes a narrow-band interference filter tuned to the wave-length of the transmitted radiation and arranged forwardly of the receiver.

72. The apparatus as defined in claim 57, wherein:
said directional radiation emitter comprises a distance measuring device operating according to the principle of transit times of the transmitted energy.

73. The apparatus as defined in claim 57, wherein:
said directional radiation emitter is structured to selectively either follow by means of its transmitted measuring radiation at least one virtual line or samples of at least one virtual surface and to receive and evaluate reflected radiation energy.

74. The apparatus as defined in claim 57, wherein:
said computer means comprises:
a central computer for performing the operations of monitoring and determining changes in the monitored region and containing:
a first input/output device;
a second input-output device;
a central processor unit;
a programmable storage;
a first read-write storage;
a second read-write storage;
a first multiple bus;
a satellite computer for performing operations on data representative of said changes in the monitored region and received from the central computer in order to enable said central computer to continue said monitoring and determination operations without interruption and containing:
an input/output device;
a central processor unit;
a programmable storage;
a read-write storage;
a second multiple bus;
a collecting bus-control unit operatively associated with both multiple buses;
a transmitter-receiver device operatively associated with said multiple buses;
a rotational transmitter;
a regulation and control unit;
a beam deflection element;
a real time clock;
a control unit;
an input unit;
an output unit;
said computer means together with said rotational transmitter, said regulation and control unit, said beam deflection element, said real time clock, said control unit, said input unit and said output unit being operatively connected with one another;
a drive unit;
current supply means;
said drive unit and said current supply means being connected with said input unit; and
means providing a connection between the current supply unit and the control unit.

75. The apparatus as defined in claim 57, wherein:
said directional radiation emitter comprises a beam splitter system operatively associated with the pulse transmitter and the receiver for dividing the transmitted energy in different directions and for the directed reception of reflected energy from such directions.

76. The apparatus as defined in claim 75, wherein:
said beam splitter system contains a beam splitter element and a beam collector;
said beam splitter system is provided with a transmitter coupling element for coupling said beam splitter system with the pulse transmitter;
a transmission conducting system for conduction of the transmitted energy to said beam splitter element and said beam collector;
a receiver coupling element for coupling the receiver to said beam collector;
a receiver conductor system for the conduction of the received energy by means of said receiver coupling element to the receiver and with which there is operatively associated said computer means for the evaluation of received signals.

77. The apparatus as defined in claim 76, wherein:
said pulse transmitter comprises a laser pulse transmitter having a lense arrangement as the transmitter coupling element for coupling the laser pulse transmitter at said transmission conducting system;
said transmission conducting system being structured as a glass fibre bundle for further conducting the transmitted energy which has been divided at individual fibres of said glass fibre bundle to said beam splitter system connected with the glass fibre bundle;
said lense arrangement comprising transmitting lenses each having a differently directed axis;
said beam collector comprising receiving lenses each having a differently directed axis; and
a further glass fibre bundle having fibres operatively associated with said receiving lenses and serving as said receiving conductor system for the further conduction of received energy by means of a further lense arrangement constructed as said receiver coupling element.

* * * * *